United States Patent
Park et al.

(10) Patent No.: US 10,560,964 B2
(45) Date of Patent: Feb. 11, 2020

(54) METHOD FOR CHANNEL ACCESS IN WIRELESS COMMUNICATION SYSTEM AND APPARATUS FOR PERFORMING SAME

(71) Applicant: LG ELECTRONICS INC., Seoul (KR)

(72) Inventors: Hanjun Park, Seoul (KR); Joonkui Ahn, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 48 days.

(21) Appl. No.: 15/751,975

(22) PCT Filed: Aug. 19, 2016

(86) PCT No.: PCT/KR2016/009188
§ 371 (c)(1),
(2) Date: Feb. 12, 2018

(87) PCT Pub. No.: WO2017/034237
PCT Pub. Date: Mar. 2, 2017

(65) Prior Publication Data
US 2018/0242364 A1    Aug. 23, 2018

Related U.S. Application Data

(60) Provisional application No. 62/207,937, filed on Aug. 21, 2015, provisional application No. 62/289,882, (Continued)

(51) Int. Cl.
*H04W 74/08* (2009.01)
*H04W 16/14* (2009.01)
(Continued)

(52) U.S. Cl.
CPC ....... *H04W 74/0816* (2013.01); *H04W 24/08* (2013.01); *H04W 16/14* (2013.01); *H04W 52/367* (2013.01)

(58) Field of Classification Search
None
See application file for complete search history.

(56) References Cited

U.S. PATENT DOCUMENTS 7,876,770 B1   1/2011  Tang et al.
2006/0264229 A1  11/2006  Guo et al.
(Continued)

FOREIGN PATENT DOCUMENTS

EP         2217030 A1    8/2010
WO    WO 2012/077971 A2  6/2012
(Continued)

OTHER PUBLICATIONS

Ericsson, "Summary of Email Discussion on ED threshold for LAA [82b-10]", 3GPP TSG RAN WG1 Meeting #83, R1-157513, Anaheim, USA, Nov. 16-20, 2015, 10 pages.

(Continued)

*Primary Examiner* — Lonnie V Sweet
(74) *Attorney, Agent, or Firm* — Birch, Stewart, Kolasch & Birch, LLP

(57) ABSTRACT

A method for performing channel access in an unlicensed band by a base station in a wireless communication system according to an embodiment of the present invention may comprise the steps of: sensing, in an unlicensed band, a carrier for transmitting a downlink signal; and transmitting the downlink signal when power detected by sensing the carrier is less than an energy detection threshold set by the base station, wherein the energy detection threshold is set to be equal to or less than a maximum energy detection threshold determined by the base station, and when another (Continued)

radio access technology (RAT) sharing the carrier exists, the maximum energy detection threshold is adaptively determined depending on the bandwidth size of the carrier, using the value, in decibels, of the ration between a reference bandwidth and the bandwidth of the carrier.

11 Claims, 19 Drawing Sheets

Related U.S. Application Data filed on Feb. 1, 2016, provisional application No. 62/290,911, filed on Feb. 3, 2016.

(51) Int. Cl.
*H04W 52/36* (2009.01)
*H04W 24/08* (2009.01)

(56) References Cited

U.S. PATENT DOCUMENTS

| | | | | |
|---|---|---|---|---|
| 2007/0135131 A1* | 6/2007 | Ishii | ...................... | H04L 47/15 455/453 |
| 2014/0269524 A1* | 9/2014 | Xiao | ................. | H04W 74/0825 370/329 |
| 2015/0195849 A1* | 7/2015 | Bashar | .................. | H04W 16/14 370/330 |
| 2016/0278088 A1* | 9/2016 | Cheng | ..................... | H04L 47/27 |
| 2017/0215205 A1* | 7/2017 | Takeda | ................... | H04M 11/00 |
| 2017/0339721 A1* | 11/2017 | Mukherjee | ............ | H04W 16/14 |

FOREIGN PATENT DOCUMENTS

| | | |
|---|---|---|
| WO | WO 2013/006006 A2 | 1/2013 |
| WO | WO 2015/157183 A1 | 10/2015 |
| WO | WO 2015/200133 A1 | 12/2015 |

OTHER PUBLICATIONS

LG Electronics, "Discussion on partial band operation in LAA", 3GPP TSG RAN WG1 Meeting #84, R1-160631, St. Julian's, Malta, Feb. 15-19, 2016, 3 pages.
Qualcomm Incorporated, "Multi-carrier operation for LAA", 3GPP TSG RAN WG1 #81, R1-152785, Fukuoka, Japan, May 25-29, 2015, XP050973237, 6 pages.
Samsung, "CCA threshold and transmission power for LAA", 3GPP TSG RAN WG1 #82, R1-154139, Beijing, China, Aug. 24-28, 2015, XP050994270, 4 pages.
Samsung, "Discusson on DL power allocation for LAA", 3GPP TSG RAN WG1 #80bis, R1-151625, Belgrade, Serbia, Apr. 20-24, 2015, XP050934495, 4 pages.

\* cited by examiner

FIG. 2
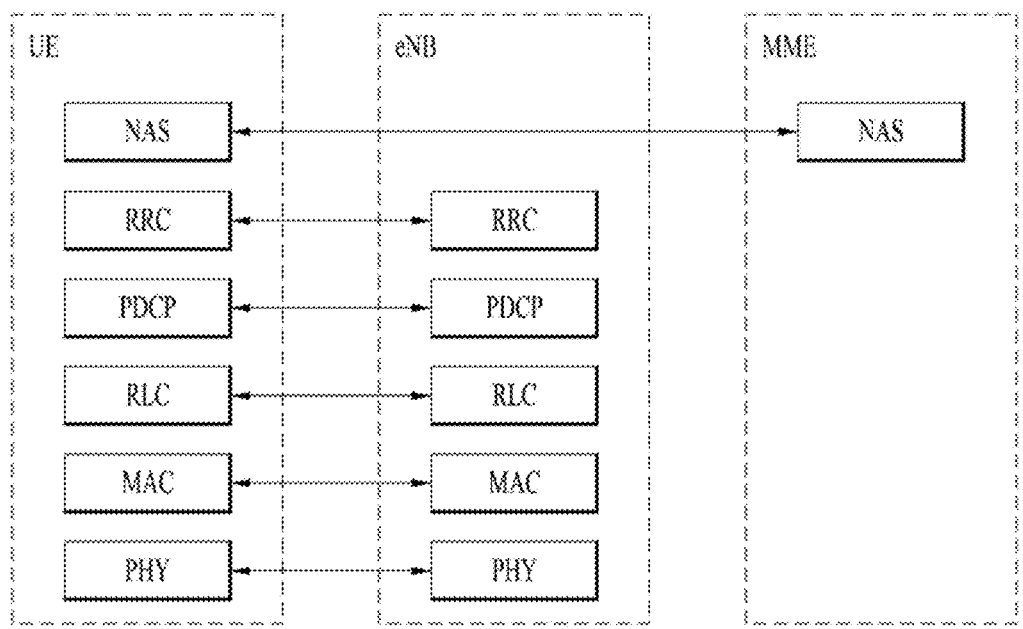
(a) Control-Plane Protocol Stack
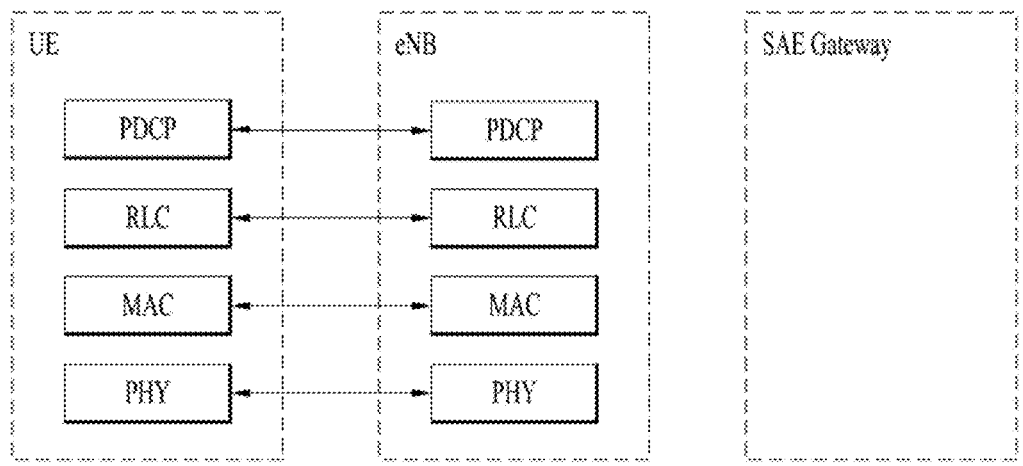
(b) User-Plane Protocol Stack

FIG. 8
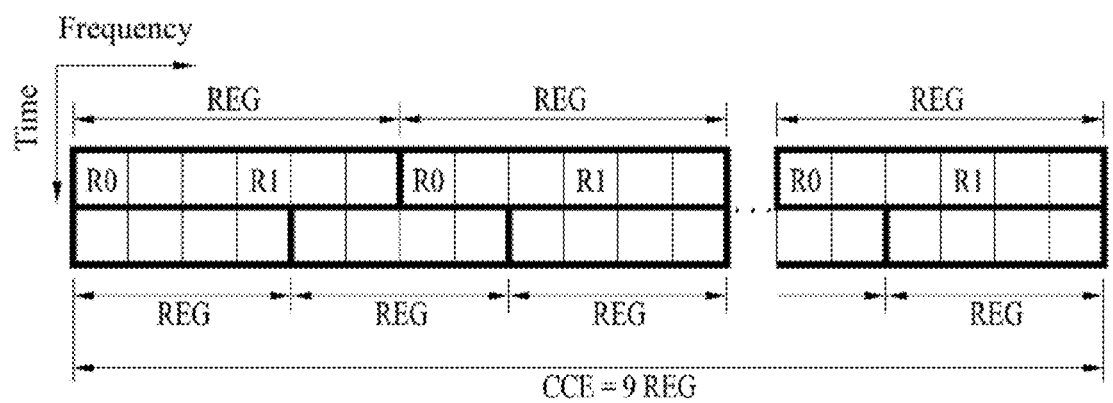
(a) 1Tx or 2Tx
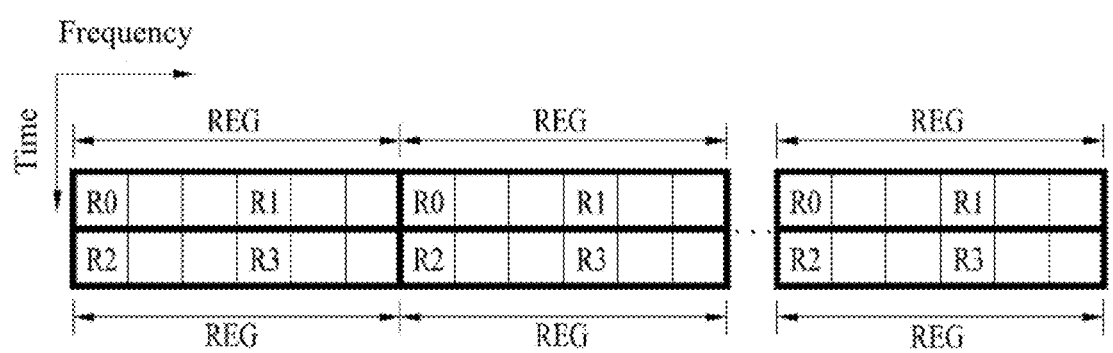
(b) 4 TX

METHOD FOR CHANNEL ACCESS IN WIRELESS COMMUNICATION SYSTEM AND APPARATUS FOR PERFORMING SAME

CROSS REFERENCE TO RELATED APPLICATIONS

This application is the National Phase of PCT International Application No. PCT/KR2016/009188, filed on Aug. 19, 2016, which claims priority under 35 U.S.C. 119(e) to U.S. Provisional Application No. 62/207,937, filed on Aug. 21, 2015, No. 62/289,882, filed on Feb. 1, 2016 and No. 62/290,911, filed on Feb. 3, 2016, all of which are hereby expressly incorporated by reference into the present application.

TECHNICAL FIELD

The present invention relates to a wireless communication system, and more particularly, to a method of performing channel access in a wireless communication system supporting an unlicensed band and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

A technical task of the present invention is to provide a method of more precisely and efficiently performing CCA (clear channel assessment) when a transmission node performs channel access on an unlicensed band cell operating on the basis of LAA (licensed-assisted access) and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of performing channel access by a base station on an unlicensed band in a wireless communication system, includes sensing a carrier of an unlicensed band for transmitting a downlink signal, and transmitting the downlink signal when power detected by sensing the carrier is less than an energy detection threshold that is configured by the base station. The energy detection threshold can be configured to be equal to or less than a maximum energy detection threshold determined by the base station. When a different radio access technology (RAT) sharing the carrier is able to exist, the maximum energy detection threshold can be determined adaptively to a bandwidth of the carrier using a decibel value of a ratio between a reference bandwidth and the bandwidth of the carrier.

In another aspect of the present invention, a base station performing channel access on an unlicensed band includes a processor to sense a carrier of an unlicensed band for transmitting a downlink signal, and a transmitter to transmit the downlink signal when power detected by sensing the carrier is less than an energy detection threshold that is configured by the base station. The energy detection threshold can be configured to be equal to or less than a maximum energy detection threshold determined by the base station. When a different radio access technology (RAT) sharing the carrier is able to exist, the maximum energy detection threshold can be determined adaptively to a bandwidth of the carrier using a decibel value of a ratio between a reference bandwidth and the bandwidth of the carrier.

Preferably, the maximum energy detection threshold can be configured to be equal to or greater than a first power value which is a sume a lower bound of the maximum energy detection threshold for the reference bandwidth and the decibel value.

And, the first power value is obtained by a first equation '−72+10*log 10(BWMHz/20 MHz) [dBm]', '20 MHz' of the first equation corresponds to the reference bandwidth, 'BWMHz' corresponds to the bandwidth of the carrier represented in a unit of MHz, '10*log 10(BWMHz/20 MHz)' corresponds to the decibel value, and '−72' may correspond to the lower bound of the maximum energy detection threshold for the reference bandwidth represented in a unit of dBm.

And, the maximum energy detection threshold can be configured to be equal to or greater than a second power value which is determined in consideration of a difference between the decibel value and maximum transmit power of the base station set for the carrier.

And, the second power value is obtained by a second equation 'min{$T_{max}$, $T_{max}$−$T_A$+($P_H$+10*log 10 (BWMHz/20 MHz))−$P_{TX}$)} [dBm]', '$T_{max}$' of the second equation corresponds to '10*log 10(3.16288*10$^{-8}$/BWMHz)', '$T_A$' corresponds to a constant predefined according to a type of the downlink signal, '$P_H$' corresponds to 23 dBm, '20 MHz' corresponds to the reference bandwidth, 'BWMHz' corresponds to the bandwidth of the carrier represented in a unit of MHz, '10*log 10(BWMHz/20 MHz)' corresponds to the decibel value, and '$P_{TX}$' may correspond to the maximum transmit power of the base station set for the carrier.

And, the maximum energy detection threshold can be determined to be a greater value among the first power value obtained by adding the decibel value to −72 dBm and the second power value.

And, when the downlink signal includes physical downlink shared channel (PDSCH), the '$T_A$' can be configured by 10 dB and when the downlink signal includes a discovery signal but does not include the PDSCH, the '$T_A$' can be configured by 5 dB.

When the different RAT sharing the carrier does not exist, the maximum energy detection threshold may not exceed $T_{max}$+10 dB.

The downlink signal is transmitted via at least one licensed-assisted access secondary cell (LAA SCell) operating based on LAA and the sensed carrier may correspond to a carrier at which the at least one LAA SCell resides.

Advantageous Effects

According to one embodiment of the present invention, when a transmission node performs channel access on a carrier of an unlicensed band, since a maximum value of an energy detection threshold for performing CCA is configured adaptively to a bandwidth of a carrier and a change of transmit power, it is able to more precisely and efficiently perform the CCA in various wireless channel environments.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 8 illustrates a UL HARQ operation in LTE system;

MODE FOR INVENTION

Figure 1:
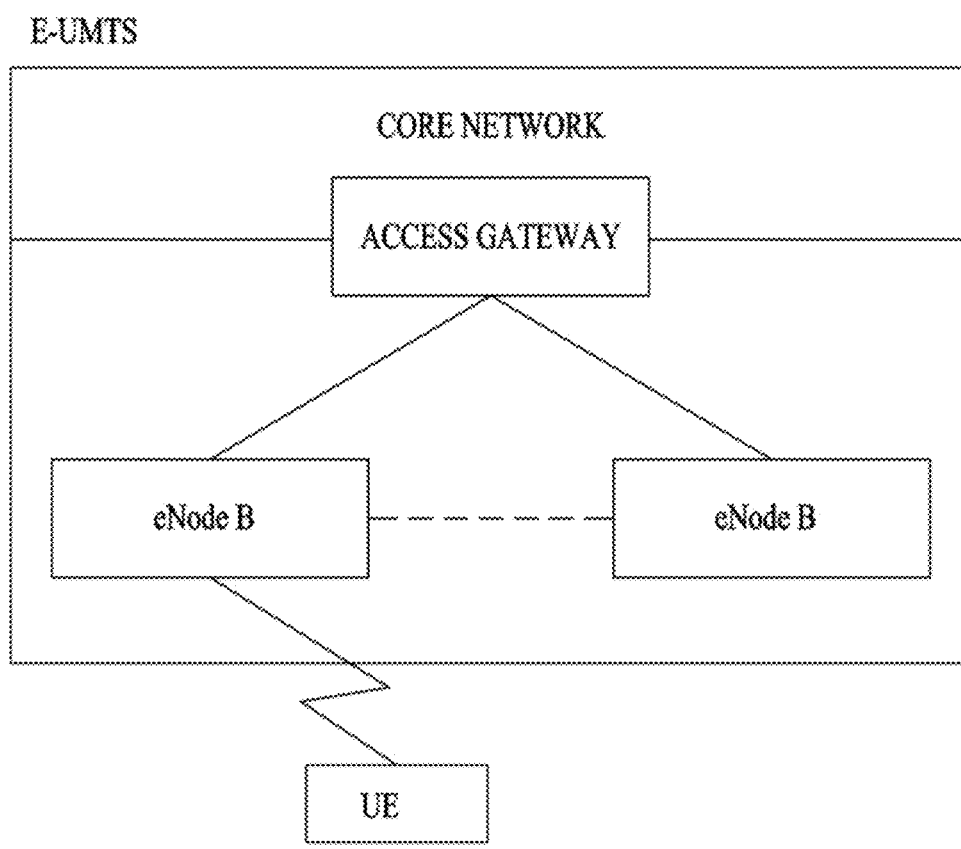
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A.

Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
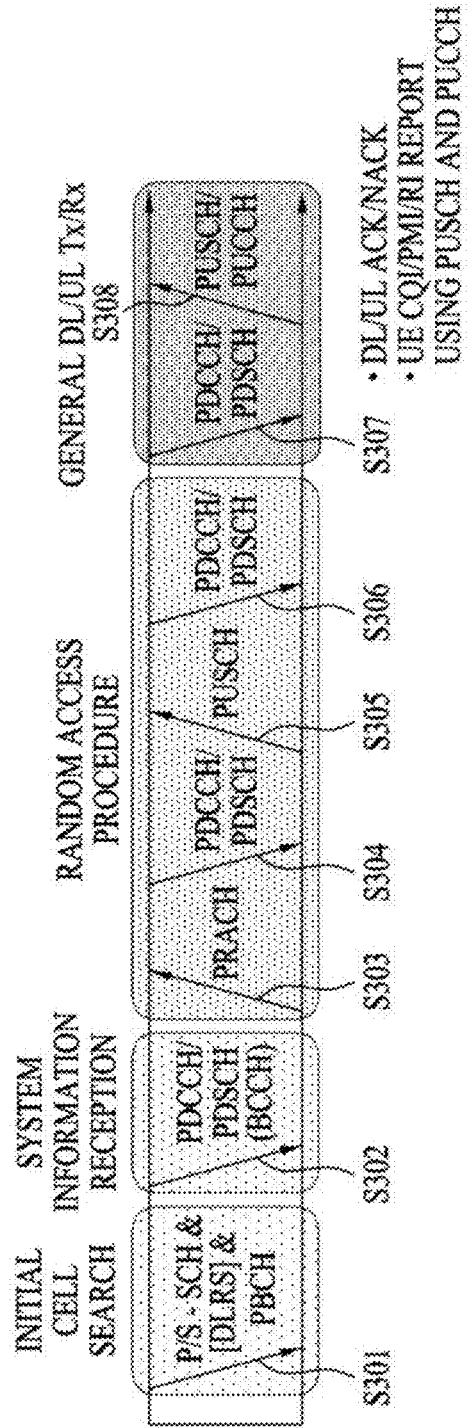
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
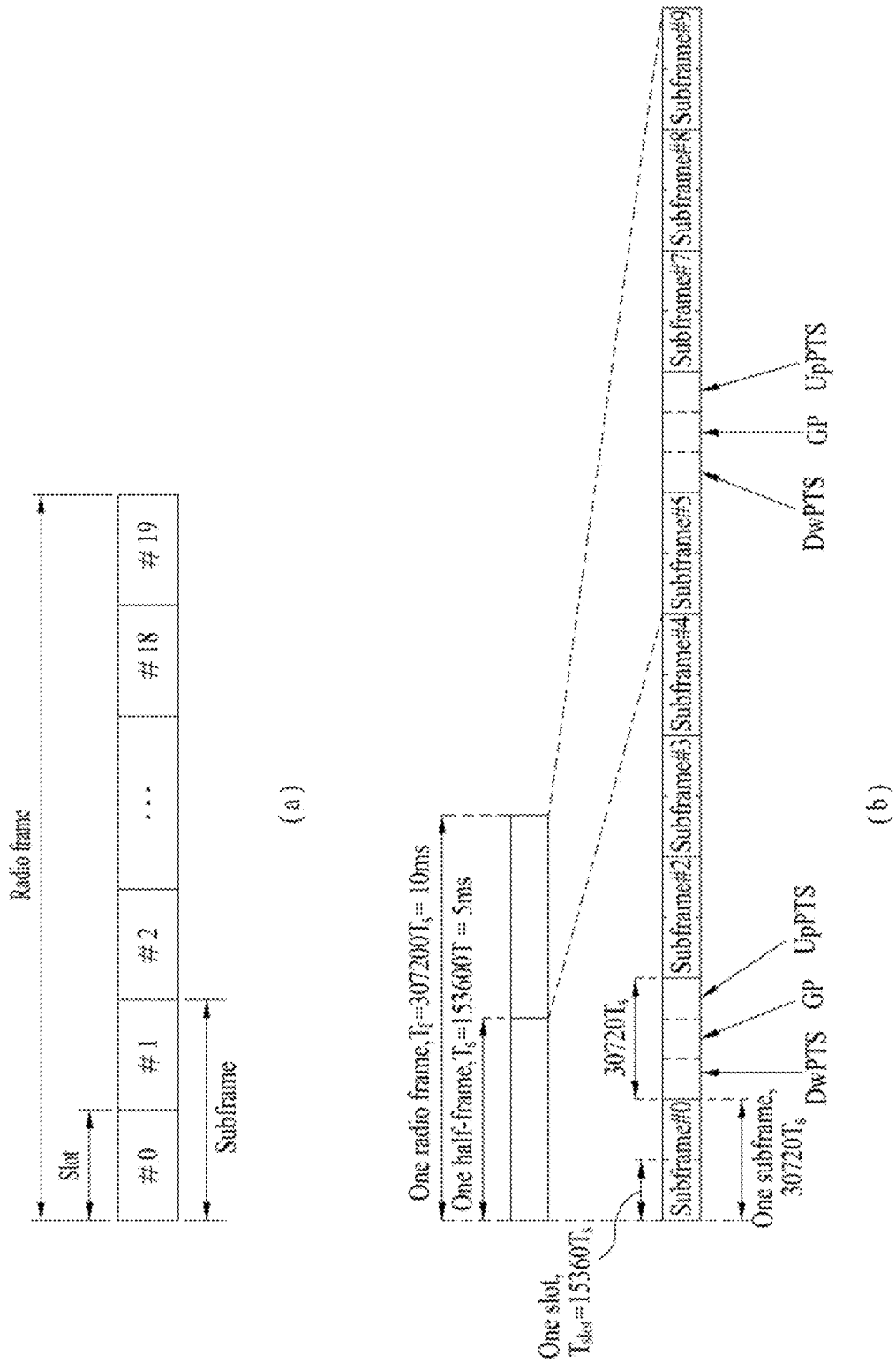
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 3 illustrates UL ACK/NACK timeline. If a user equipment receives PDCCH and PDSCH scheduled by the PDCCH in a subframe #(n−k), it indicates that UL ACK/NACK is transmitted in a subframe #n in response to the received PDSCH.

And, the ACK/NACK for the PDSCH is transmitted on PUCCH corresponding to a UL control channel. In this case, information transmitted through the PUCCH may vary depending on a format. It is summarized as follows.

In LTE system, a PUCCH resource for ACK/NACK is not allocated to each UE in advance. Instead, a plurality of UEs belonging to a cell use a plurality of PUCCH resources by sharing the resources at every timing. Specifically, a PUCCH resource, which is used for a UE to transmit ACK/NACK, is implicitly determined based on PDCCH carrying scheduling information on PDSCH on which corresponding DL data is carried. In each DL subframe, the whole region to which PDCCH is transmitted consists of a plurality of CCEs (control channel elements) and PDCCH transmitted to a UE consists of one or more CCEs. A CCE includes a plurality of (e.g., 9) REGs (resource element groups). One REG includes 4 adjacent REs (resource elements) except a reference signal (RS). A UE transmits ACK/NACK via an implicit PUCCH resource which is induced or calculated by a function of a specific CCE index (e.g., first or lowest CCE index) among CCE indexes constructing the PDCCH received by the UE.

In this case, each PUCCH resource index corresponds to a PUCCH resource for ACK/NACK. For example, if scheduling information on PDSCH is transmitted to a UE via PDCCH configured by CCE indexes 4 to 6, the UE can transmit ACK/NACK to a BS via PUCCH, e.g., fourth PUCCH, induced or calculated from a $4^{th}$ CCE index corresponding to the lowest CCE index among the CCEs constructing the PDCCH.

PUCCH format 1a/1b transmits A/N information, PUCCH format 2/2a/2b transmits CQI, CQI+A/N information, and PUCCH format 3 can transmit multiple A/N information.

The structure of the aforementioned radio frame is only exemplary, and various modifications may be made in the number of subframes included in the radio frame, the number of slots included in the subframe, or the number of symbols included in the slot.

Figure 5:
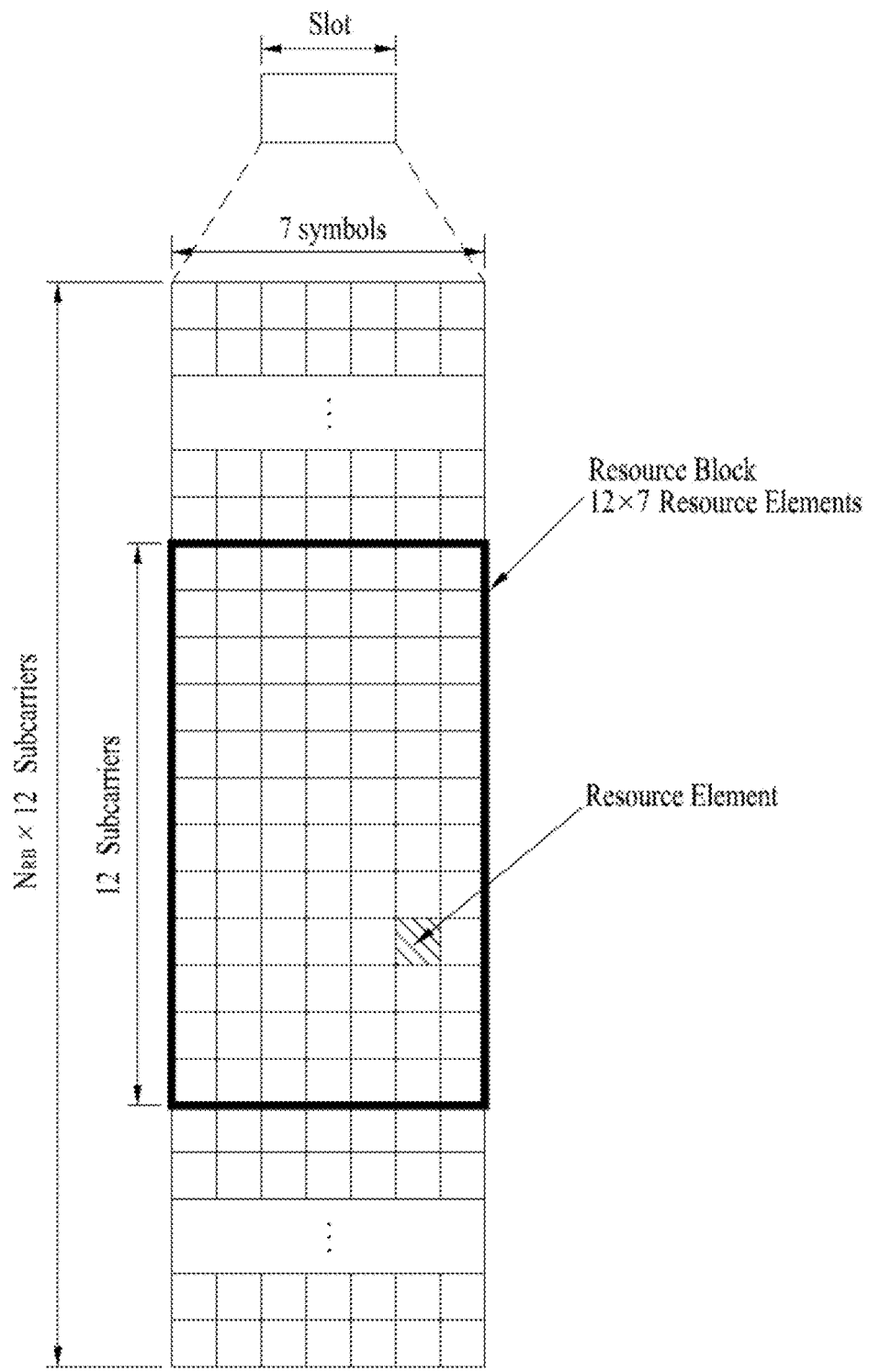
FIG. 5 is a diagram for an example of a resource grid for a downlink slot.

FIG. 5 is a diagram of a resource grid for a downlink slot.

Referring to FIG. 5, a DL slot includes $N_{symb}^{DL}$ OFDM symbols in time domain and $N_{RB}^{DL}$ resource blocks. Since each of the resource blocks includes $N_{sc}^{RB}$ subcarriers, the DL slot includes $N_{RB}^{DL} \times N_{sc}^{RB}$ subcarriers in frequency domain. FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N_{symb}^{DL} \times N_{sc}^{RB}$ resource elements. The number $N_{RB}^{DL}$ of resource blocks included in the DL slot is dependent on a DL transmission bandwidth configured in a cell.

Figure 6:
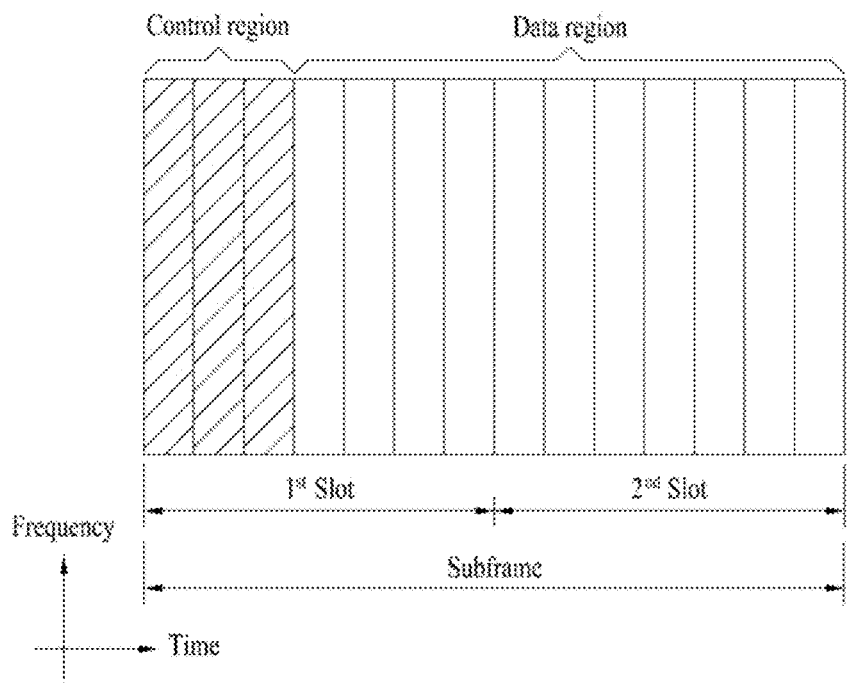
FIG. 6 is a diagram illustrating a structure of a downlink radio frame used in an LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
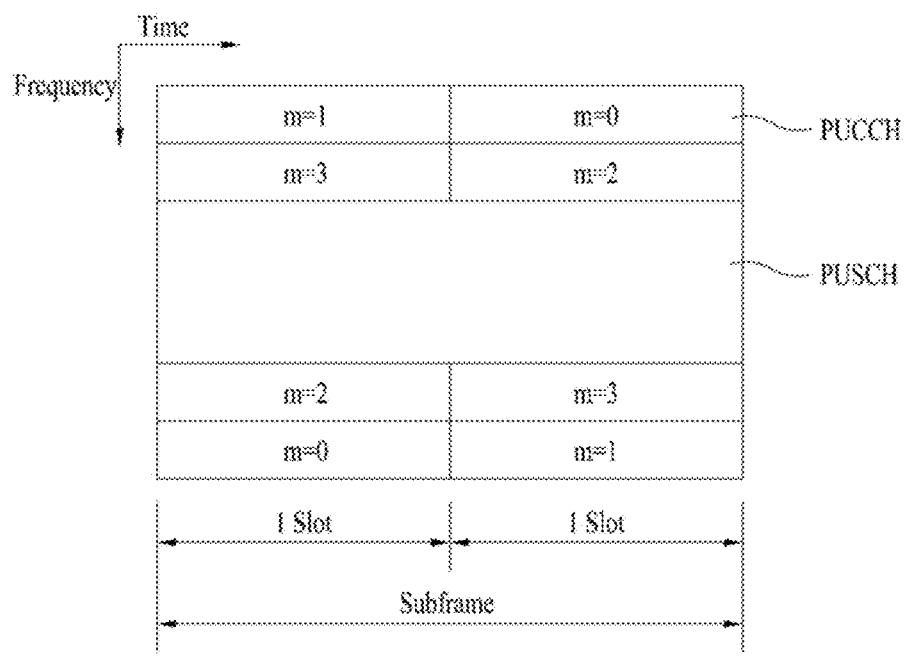
FIG. 7 is a diagram illustrating a structure of an uplink subframe used in an LTE system.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

FIG. 8 is a diagram of a resource unit used for constructing a downlink control channel in LTE system. In particular, FIG. 8(a) indicates a case that the number of transmitting antennas of an eNode B corresponds to 1 or 2 and FIG. 8(b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 8, a base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs contiguously arranged by $M^{(L)}$ ($\geq L$) number of CCEs or a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 4 in the following.

TABLE 4

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L indicates the number of CCE consisting of PDCCH, $S_k^{(L)}$ indicates a search space of the CCE aggregation level L and $M^{(L)}$ indicates the number of candidate PDCCHs monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

Figure 9:
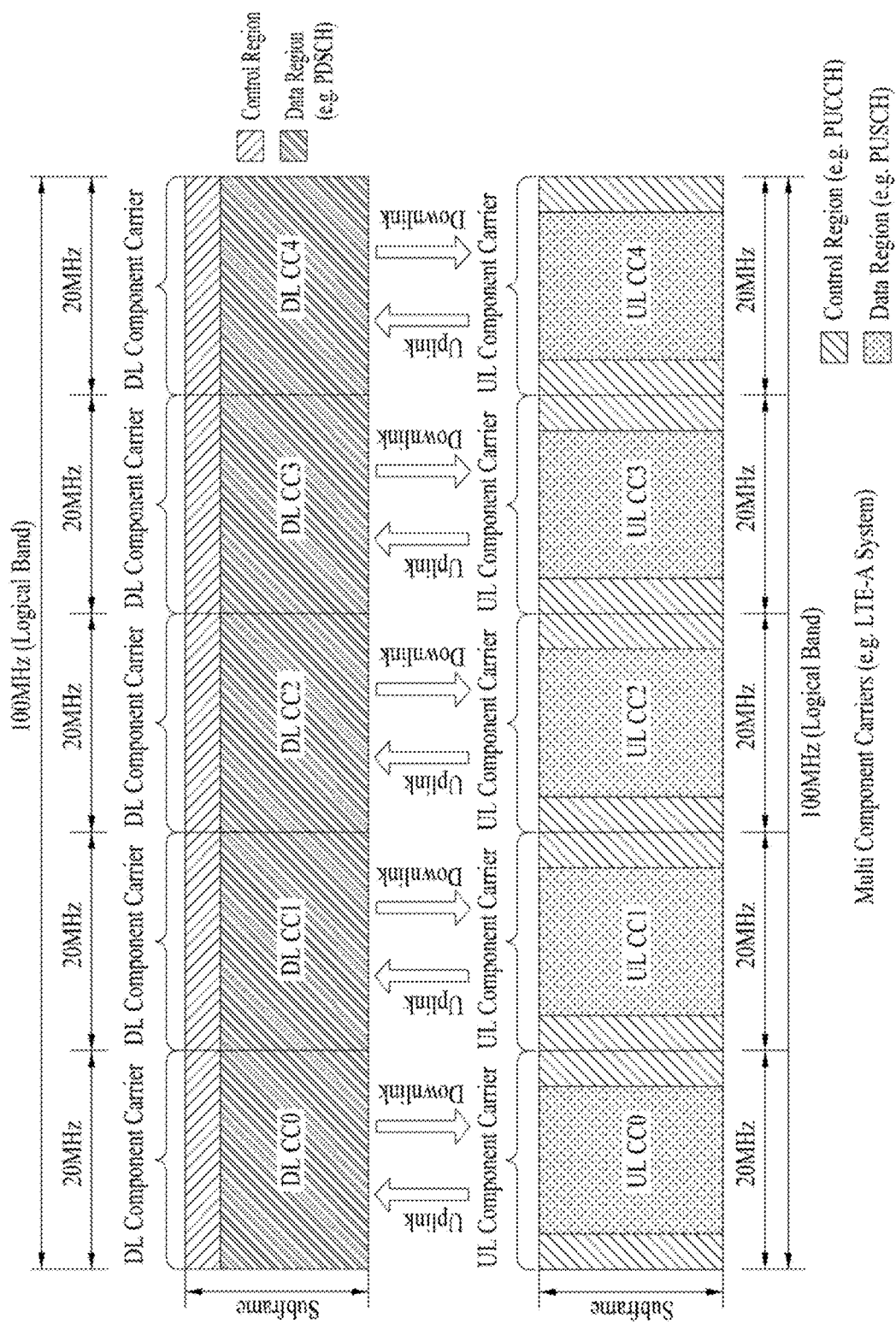
FIG. 9 is a diagram for explaining FDD system and DL/UL HARQ timeline.

FIG. 9 is a diagram for an example of a carrier aggregation (CA) communication system.

Referring to FIG. 9, a wider UL/DL bandwidth can be supported in a manner of aggregating a plurality of UL/DL component carriers (CC). Such a term as a component carrier (CC) can be replaced with a different equivalent term (e.g., carrier, cell, etc.). Each of the component carriers may be adjacent to each other or non-adjacent to each other. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

If cross-carrier scheduling (or, cross-CC scheduling) is applied, PDCCH for DL allocation is transmitted via a DL CC #0 and corresponding PDSCH can be transmitted via a DL CC #2. For the cross-CC scheduling, it may consider introducing a CIF (carrier indicator field). A configuration informing whether a CIF exists or not within a PDCCH can be semi-statically and user-specifically (or user group-specifically) enabled via an upper layer signaling (e.g., RRC signaling).

In case that a CIF exists within a PDCCH, a base station may be able to assign a monitoring DL CC set to reduce BD complexity of a user equipment side. The PDCCH monitoring DL CC set corresponds to a part of the entire aggregated DL CCs and includes one or more DL CCs. A user equipment may be able to perform a detection/decoding of the PDCCH on a corresponding DL CC only. In particular, the base station may be able to transmit the PDCCH via the monitoring DL CC set only. The PDCCH monitoring DL CC set may be configured UE-specifically, UE group-specifically or cell-specifically. Such a term as PDCCH monitoring DL CC can be replaced with such an equivalent term as a monitoring carrier, a monitoring cell, and the like. And, CCs aggregated for a UE can be replaced with such an equivalent term as a serving CC, a serving carrier, a serving cell, and the like.

Figure 10:
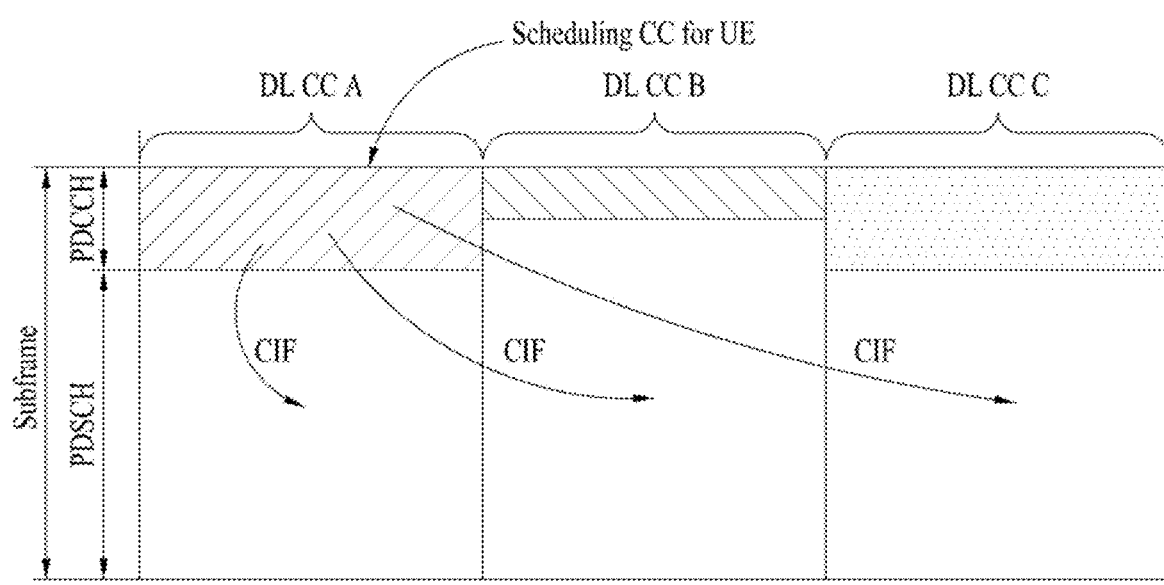
FIG. 10 illustrates scheduling in a case that a plurality of carriers are aggregated.

FIG. 10 is a diagram for an example of a case that 3 DL CCs are aggregated and a DL CC A is configured as a monitoring DL CC. DL CCs A to C can be referred to as a serving CC, a serving carrier, a serving cell, or the like. If a CIF is disabled, each of DL CCs may be able to transmit PDCCH, which schedules PDSCH of each of the DL CCs, without a CIF according to an LTE PDCCH rule. On the other hand, if the CIF is enabled by UE-specific (UE group-specific or cell-specific) upper layer signaling, only the DL CC A (monitoring DL CC) may be able to transmit the PDCCH, which schedules the PDSCH of a different DL CC as well as the PDSCH of the DL CC A using the CIF. In this case, PDCCH is not transmitted on a DL CC B and a DL CC C, which are not configured as a PDCCH monitoring DL CC. Hence, the DL CC A (monitoring DL CC) should include a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers using a CIF in PDCCH to perform cross-CC scheduling. Whether or not a CIF is used (i.e., whether or not cross-CC scheduling mode or non-cross-CC scheduling mode is supported) and switching between modes can be semi-statically or UE-specifically configured via RRC signaling. After the RRC signaling is performed, a UE is able to recognize whether or not a CIF is used within PDCCH to be scheduled to the UE.

In the following, a HARQ (hybrid automatic repeat and request) in a wireless communication system is explained.

When there exist a plurality of UEs having data to be transmitted in UL/DL in a wireless communication system, a base station selects a UE to transmit the data from among a plurality of the UEs at every transmission unit time (transmission time interval (TTI) (e.g., subframe)). In particular, in a system using multiple carriers or a system similar to the system, the base station selects not only UEs to transmit data in UL/DL at every TTI but also a frequency band to be used by each of the selected UEs to transmit the data.

On the basis of UL, if the UEs transmit a reference signal (or pilot signal) to the base station in UL, the base station identifies channel states of the UEs using the reference signal received from the UEs and selects UEs to transmit data in UL on each unit frequency band at every TTI. The base station informs the UEs of a result of the selection. In particular, the base station transmits a UL assignment message to a UE UL scheduled at specific TTI to indicate the UE to transmit data using a specific frequency band. The UL assignment message is also referred to as a UL grant. The UE transmits the data in UL according to the UL assignment message. Basically, the UL assignment message includes information on a UE ID (UE identity), RB allocation information, payload, etc. In addition, the UL assignment message can include an IR (incremental redundancy) version, NDI (new data indication), and the like.

In case of using a synchronous non-adaptive HARQ scheme, when a UE scheduled at specific time performs retransmission, retransmission time is systematically promised between the UE and the base station (e.g., after 4 subframes from the timing at which NACK is received). Hence, the base station can transmit the UL grant message to the UE at the initial transmission only and the retransmission can be performed by ACK/NACK signal. On the contrary, in case of using an asynchronous adaptive HARQ scheme, since retransmission time is not promised between the base station and the UE, it is necessary for the base station to transmit a retransmission request message to the UE. Moreover, since a frequency resource for retransmission or MCS varies depending on transmission timing, the base station should transmit not only a UE ID, RB allocation information, and payload but also a HARQ process index, IR version, and NDI information to the UE at the time of transmitting the retransmission request message to the UE.

Figure 11:
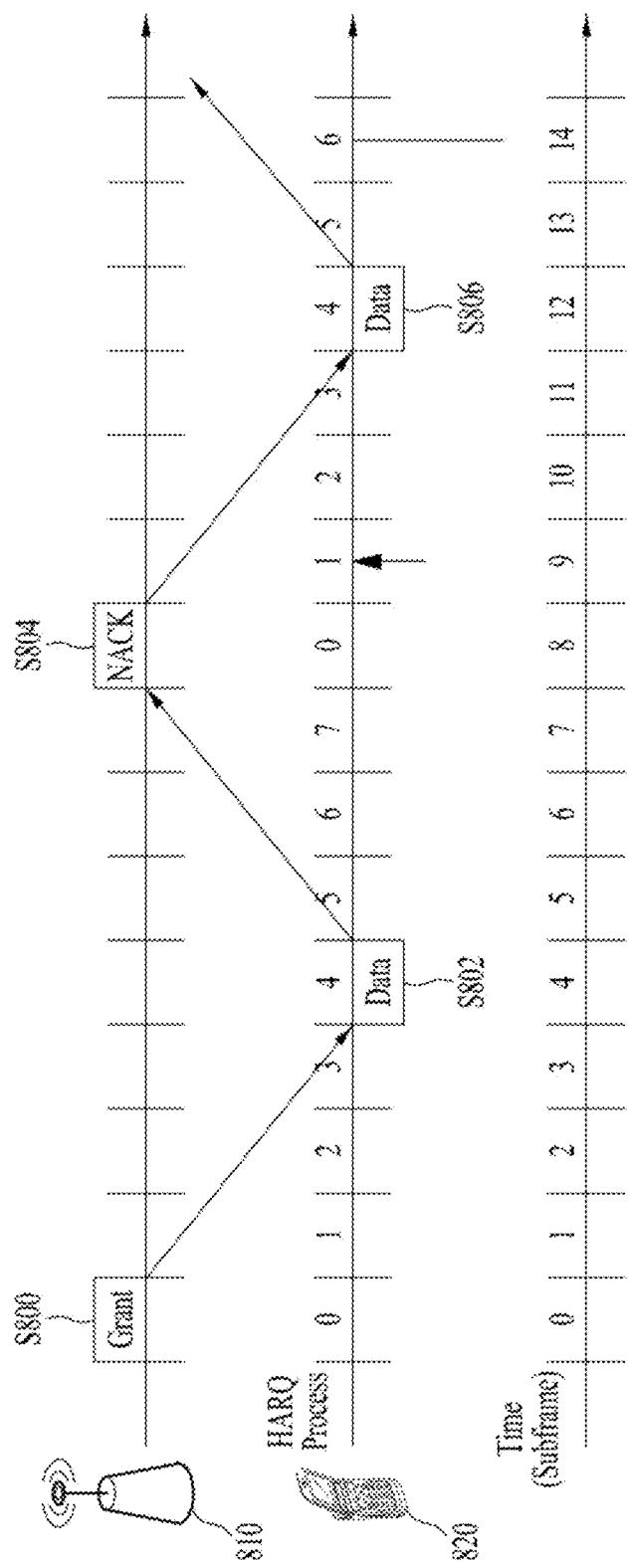
FIG. 11 illustrates a UL HARQ operation in LTE system.

FIG. 11 illustrates a UL HARQ operation in LTE system. In LTE system, a UL HARQ scheme uses synchronous non-adaptive HARQ. In case of using 8-channel HARQ, HARQ process numbers are given by 0 to 7. One HARQ process operates at every TTI (e.g., subframe). Referring to FIG. 11, a base station 810 transmits a UL grant to a UE 820 through PDCCH [S800]. The UE transmits UL data to the base station 810 using an RB designated by the UL grant and MCS after 4 subframes (e.g., subframe #4) from the timing (e.g., subframe #0) at which the UL grant is received [S802]. After the UL data received from the UE 820 is decoded, the base station 810 generates ACK/NACK. If the base station fails to decode the UL data, the base station 810 transmits NACK to the UE 820 [S804]. The UE 820 retransmits UL data to the base station after 4 subframes from the timing at which the NACK is received [S806]. In this case, the initial transmission and the retransmission of the UL data are performed by the same HARQ process (e.g., HARQ process 4).

In the following, DL/UL HARQ operation in FDD system is explained.

Figure 12:
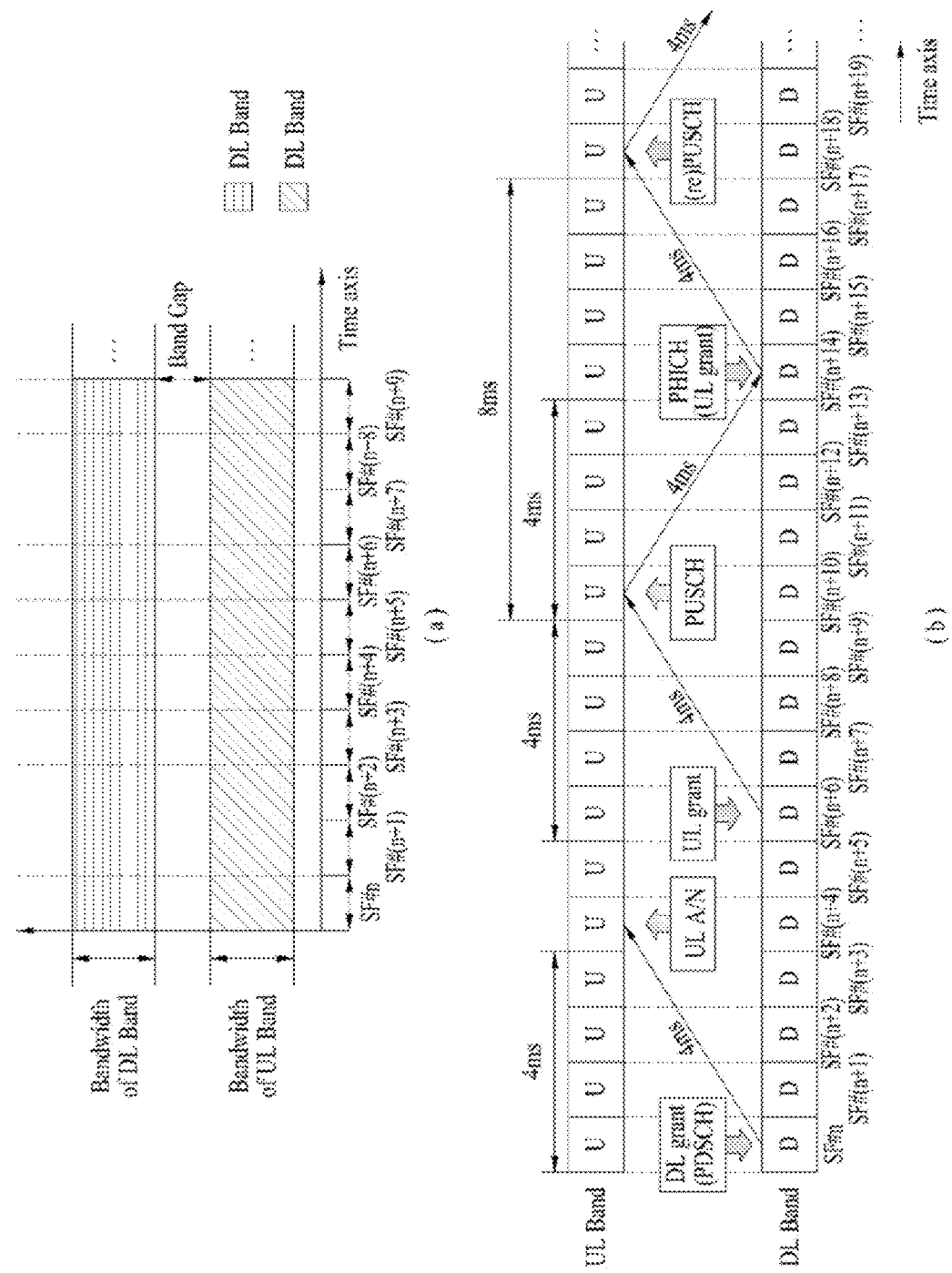
FIG. 12 is a diagram for explaining FDD system and DL/UL HARQ timeline.

FIG. 12 is a diagram for explaining a FDD system and a DL/UL HARQ timeline. In case of the FDD system illustrated in FIG. 12(a), transmission/reception of a DL/UL data corresponding to a specific UL/DL data is received after 4 ms. Referring to FIG. 12(b), for example, UL ACK/NACK is transmitted after 4 ms from the timing at which PDSCH/DL grant is received in response to the PDSCH, PUSCH is transmitted after 4 ms from the timing at which UL grant/PHICH is received in response to the UL grant/PHICH, and PHICH/UL grant is received after 4 ms from the timing at which PUSCH is transmitted/retransmitted in response to the PUSCH transmission/retransmission.

And, a synchronous HARQ scheme is used for a UL HARQ operation and an asynchronous HARQ scheme is used for a DL HARQ operation in 3GPP LTE system. The synchronous HARQ scheme corresponds to a scheme that retransmission is performed at a timing determined by a system when initial transmission fails. In particular, transmission/retransmission of UL data interlocked with a specific HARQ process or timing associated with a UL grant/PHICH timeline is defined in advance and it is difficult to randomly change the transmission/retransmission or the timing. On the contrary, according to the asynchronous HARQ scheme, when an initial transmission of data fails, retransmission of the data can be performed at a random timing appearing after 8 ms including the initial transmission timing.

In the aforementioned FIGS. 11 and 12, each of the HARQ processes is defined by a unique HARQ process identifier having a size of 3 bits and it is necessary for a receiving end (i.e., a UE in a DL HARQ process, an eNB in a UL HARQ process) to allocate an individual soft buffer to combine retransmitted data.

In the following, HARQ timing in environment in which a TDD cell and a FDD cell are aggregated is explained. For example, assume that a TDD Pcell and a FD Scell are aggregated by CA (carrier aggregation). If a UE apply DL timing (e.g., 4 ms) defined for legacy FDD to PDSCH received via the FDD Scell as it is, since the TDD Pcell is configured by a DL subframe at the DL HARQ timing, it may be difficult to transmit ACK/NACK. Hence, when the TDD cell and the FDD cell are aggregated, it may define new DL HARQ timing and new UL HARQ timing. Examples of the new DL HARQ timing and the new UL HARQ timing are described in the following.

DL HARQ timing for TDD Scell, in case of FDD Pcell

In case of performing self-scheduling and cross carrier scheduling, HARQ timing for PDSCH of the TDD Scell can be configured to be identical to HARQ timing for the FDD Pcell. For example, ACK/NACK information on PDSCH of the Scell can be transmitted via the Pcell.

UL HARQ timing for TDD Scell, in case of FDD Pcell

Self-scheduling: HARQ timing for PUSCH transmitted via the Scell can be configured based on HARQ timing scheduled to the TDD cell.

Cross carrier scheduling: (i) Similar to the self-scheduling, HARQ timing for PUSCH transmitted via the Scell can be configured based on HARQ timing scheduled to the TDD cell. (ii) Or, ACK/NACK information can be received via PHICH after 6 ms from timing at which PUSCH is transmitted via the Scell. (iii) Or, HARQ timing can be configured based on reference UL-DL configuration obtained by a scheduling cell.

DL HARQ timing for FDD Scell, in case of TDD Pcell

Self-scheduling: (i) HARQ timing for PDSCH of the Scell can be configured by additional timing different from HARQ timing of the TDD Pcell and HARQ timing of the TDD Pcell based on UL-DL configuration of the TDD Pcell. Or, It may define new timing including more DL subframes than the legacy TDD Pcell HARQ timing according to UL-DL configuration of the TDD Pcell. For details, it may refer to Table 5 in the following. (ii) Or, HARQ timing for PDSCH of the Scell can be determined based on reference UL-DL configuration set to the FDD Scell. The reference UL-DL configuration can be determined based on UL-DL configuration of the TDD Pcell. And, it may configure additional HARQ timings different from the HARQ timing of the TDD Pcell. For more details, it may refer to Tables 6, 7, and 8 in the following.

Cross carrier scheduling: HARQ timing for PDSCH of the Scell can be configured to be identical to the self-scheduling or the HARQ timing of the TDD Pcell.

UL HARQ timing for FDD Scell, in case of TDD Pcell

Self scheduling: HARQ timing for PUSCH transmitted via the Scell can be configured by FDD HARQ timing.

Cross carrier scheduling: (i) HARQ timing for PUSCH transmitted via the Scell may follow HARQ timing of the TDD Pcell or FDD HARQ timing. (ii) Or, as an example, ACK/NACK information can be received via PHICH after 6 ms from timing at which PUSCH is transmitted via the Scell. Unlikely, it may configure by FDD HARQ timing.

Table 5 corresponds to a TDD Pcell case and shows detail examples of (i) the self-scheduling case of the DL HARQ timing (e.g., 'DL association set index') for the FDD Scell.

TABLE 5

| UL-DL Conf. | HARQ timing | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 0A | — | — | 6, [5] | [5], [4] | 4 | — | — | 6, [5] | [5], [4] | 4 |
| 0 | 0B | — | — | 6, [5], [4] | | [5], 4 | | | 6, [5], [4] | | [5], 4 |
| 1 | 1 | — | — | 7, 6, [5] | [5], 4 | — | — | — | 7, 6, [5] | [5], 4 | — |
| 1 | 1* | — | — | 7, 6 | [6], [5], 4 | | | — | 7, 6 | [6], [5], 4 | |
| 2 | 2 | — | — | 8, 7, 6, [5], 4 | — | | — | — | 8, 7, 6, [5], 4 | — | — |
| 3 | 3 | — | — | 11, [10], [9], [8], 7, 6 | 6, 5 | 5, 4 | — | — | | — | |
| 3 | 3a | — | — | 11, [10], 7, 6 | [10], 6, 5 | [10], 5, 4 | | | | | |
| 4 | 4 | — | — | 12, 11, [10], [9], 8, 7 | 7, 6, 5, 4 | | | | | | |
| 4 | 4a | | | 12, 11, [10], 8, 7 | [10], 7, 6, 5, 4 | | | | | | |
| 5 | 5 | — | — | 13, 12, 11, [10], 9, 8, 7, 6, 5, 4 | — | — | | | — | — | |
| 6 | 6 | — | — | [8], 7 | 7, [6] | [6], 5 | — | — | 7 | 7, [6], [5] | — |
| 6 | 6* | — | — | 7 | 7, [6], [5] | 5 | — | — | 7, [6], [5], [4] | 7 | — |

In Table 5, UL-DL configuration may correspond to U/D configuration of the TDD Pcell. DL HARQ timing for the FDD Scell can be defined by a type/index of HARQ timing associated with the TDD Pcell U/D. 'DL association set index' may correspond to "[ ]" in Table 5. In particular, the "[ ]" may correspond to a DL association set index added to the TDD Pcell U/D configuration. For example, in case of UL-DL configuration 0 and HARQ timing 0 A, a subframe #2 transmit ACK/NACK for PDSCH (i.e., subframe #6 of a previous frame) of the FDD Scell which is received 5 subframes ahead and ACK/NACK for PDSCH (i.e., subframe #7 of a previous frame) of the FDD Scell which is received 6 subframes ahead, respectively. A subframe #3 transmit ACK/NACK for PDSCH (i.e., subframe #8 of a previous frame) of the FDD Scell which is received 5 subframes ahead and ACK/NACK for PDSCH (i.e., subframe #9 of a previous frame) of the FDD Scell which is received 4 subframes ahead, respectively.

Tables 6, 7, and 8 correspond to a TDD Pcell case and shows detail examples of (ii) the self-scheduling case of the DL HARQ timing (e.g., 'DL association set index') for the FDD Scell.

TABLE 6

| TDD PCell U/D configuration | Allowed reference configuration for FDD SCell |
| --- | --- |
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

TABLE 7

| TDD PCell U/D configuration | Allowed reference configuration for FDD SCell |
| --- | --- |
| 0 | {2, 4, 5} |
| 1 | {2, 4, 5} |
| 2 | {2, 5} |
| 3 | {4, 5} |
| 4 | {4, 5} |
| 5 | {5} |
| 6 | {2, 4, 5} |

TABLE 8

| TDD PCell U/D configuration | Allowed reference configuration for FDD SCell (2 aggregated cells) | Allowed reference configuration for FDD SCell (more than 2 aggregated cells) |
| --- | --- | --- |
| 0 | 5 | 2 |
| 1 | 5 | 2 |
| 2 | 5 | 2 |
| 3 | 5 | 4 |
| 4 | 5 | 4 |
| 5 | 5 | Not applicable |
| 6 | 5 | 2 |

In the following, ACK/NACK multiplexing or bundling scheme is explained.

An ACK/NACK multiplexing (i.e., ACK/NACK selection) method applied to Rel-8 TDD system considers an ACK/NACK selection scheme that uses an implicit PUCCH resource corresponding (i.e., linked to a lowest CCE index) to PDCCH scheduling each PDSCH of a UE to secure a PUCCH resource of the UE.

Meanwhile, LTE-A FDD system basically considers transmitting a plurality of ACKs/NACKs in response to a plurality of PDSCHs, which are transmitted via a plurality of DL component carriers, through a UE-specifically configured specific UL CC. To this end, LTE-A FDD system considers "ACK/NACK selection" scheme using an implicit PUCCH resource linked with PDCCH that schedules a specific DL component carrier, a part of DL component carriers, or all DL component carriers (i.e., linked with a lowest CCE index nCCE, or nCCE and nCCE+1), or a combination of the implicit PUCCH resource and an explicit PUCCH resource reserved to each UE in advance via RRC signaling.

LTE-A TDD system can also consider a situation that pluralities of component carriers are aggregated. Hence, it may consider transmitting a plurality of ACK/NACK information/signals in response to a plurality of PDSCHs, which are transmitted via a plurality of DL subframes and a plurality of component carriers, in UL subframes corresponding to a plurality of the DL subframes via a specific CC (i.e., AN/CC). In this case, unlike the LTE-A FDD, it may consider a scheme of transmitting a plurality of ACKs/NACKs corresponding to the maximum number of CWs capable of being transmitted via all component carriers assigned to a UE to all of a plurality of DL subframes (i.e., full ACK/NACK) or a scheme of transmitting ACKs/NACKs by reducing the number of ACKS/NACKs by applying ACK/NACK bundling to CW and/or CC and/or SF domain (i.e., bundles ACK/NACK). In this case, in case of the CW bundling, ACK/NACK bundling for CW is applied to each DL subframe according to a component carrier. In case of the CC bundling, ACK/NACK bundling for all or a part of CCs is applied to each DL subframe. In case of the SF bundling, ACK/NACK bundling for all or a part of DL SFs is applied to each CC.

Meanwhile, LTE-A system considers transmitting a plurality of ACK/NACK information/signals for a plurality of PDSCHs, which are transmitted via a plurality of DL component carriers (DL CCs), via a specific UL component carrier (UL CC). In this case, unlike ACK/NACK transmission using a PUCCH format 1a/2b in legacy Rel-8 LTE, it may consider a method of transmitting a plurality of ACK/NACK information and/or control signals using a PUCCH format 2 or a PUCCH format 3 corresponding to a form modified based on block-spreading scheme after channel coding (e.g., Reed-Muller code, Tail-biting convolutional code, etc.) is performed on a plurality of the ACK/NACK information.

In this case, the block-spread scheme corresponds to a method of modulating control information (e.g., ACK/NACK, etc.) transmission using SC-FDMA scheme rather than a PUCCH format 1 or 2 of legacy LTE. According to the block-spread scheme, a symbol sequence can be transmitted in a manner of being spread in time domain by an OCC (orthogonal cover code). In this case, it may be able to multiplex control signals of a plurality of UEs with the same resource block (RB) using the OCC.

5 GHz unlicensed band or 2.4 GHz unlicensed band used by WiFi system can be utilized for traffic offloading.

Figure 13:
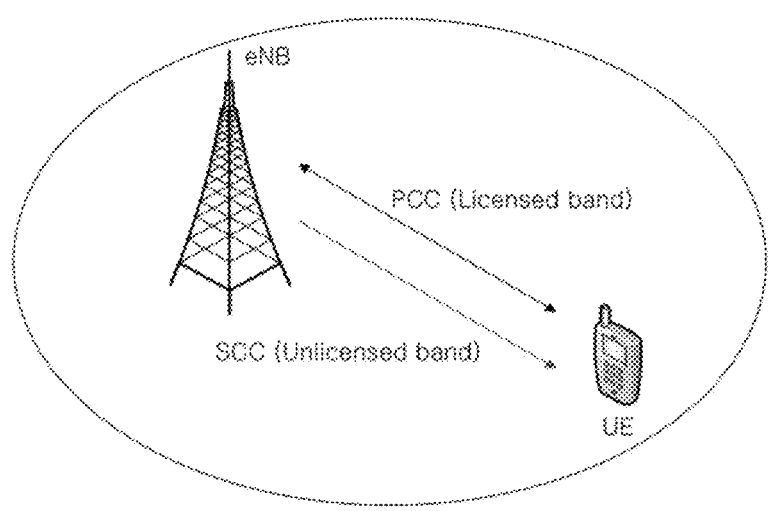
FIG. 13 is a diagram for an example of a method of using an unlicensed band.

FIG. 13 is a diagram for an example of a method of using an unlicensed band.

For clarity, assume a situation that a communication node is configured to perform wireless communication via a CC of a licensed band and a CC of an unlicensed band. According to the embodiment of FIG. 13, an eNB may transmit a signal to a UE or the UE may transmit a signal to the eNB in a CA (carrier aggregation) situation of the LTE/LTE-A licensed band and the LTE-U unlicensed band.

ACC of a licensed band can be referred to as L-CC (licensed CC) or L-cell (licensed CC) as well. A CC of an unlicensed band can be referred to as U-CC (unlicensed band CC) or U-cell (unlicensed band CC) as well. For clarity, it may assume that a CC accessed by a UE in the U-band is U-Scell and a CC accessed in the L-band is Pcell. For clarity, assume that a Pcell (PCC) is positioned at a licensed band and at least one of SCells (SCC) is positioned at an unlicensed band, by which the present invention may be non-limited. For example, a plurality of licensed bands and a plurality of unlicensed bands can be CA or a signal can be transceived between the eNB and the UE on an unlicensed band only.

DL transmission of an eNB or UL transmission of a UE is not always guaranteed in U-band. Hence, an LTE UE operating on the U-band may access a different cell operating on L-band (licensed band) to stably control mobility, an RRM (radio resource management) function, and the like. Moreover, the embodiments of the present invention can be extensively applied not only to 3GPP LTE/LTE-A system, but also to other wireless communication systems.

A scheme of performing data transmission and reception on U-band using a combination with L-band is commonly referred to as LAA (licensed assisted access). If U-cell positioned at U-band is used by the LAA scheme, the U-cell can be simply referred to as LAA-cell. For example, LAA-Scell may correspond to a Scell positioned at an unlicensed band used by the LAA scheme. For clarity, such a term as LAA-(S)cell, U-band, and U-(S)cell can be used in a manner of being mixed. And, a cell can also be referred to as a CC (component carrier) or a carrier.

Since an unlicensed band basically assumes that wireless transmission and reception are performed via contention between communication nodes, it is required for each communication node to perform channel sensing (CS) before a signal is transmitted to check whether or not a different communication node transmits a signal. The channel sensing is referred to as CCA (clear channel assessment) or carrier sensing. An eNB or a UE of LTE system can also perform the CCA to transmit a signal in an unlicensed band.

As an example of an unlicensed band operation operating with a contention-based random access scheme, a communication node (e.g., eNB) checks whether a current channel of an UCell is busy or idle by performing carrier sensing (CS) before a data is transmitted and received. For example, when there is a CCA (Clear Channel Assessment) threshold configured by predefined signaling or a higher layer signaling, if energy higher than the CCA threshold is detected in the UCell, it is determined as the UCell is in a busy state. Otherwise, it is determined as the UCell is in an idle state. If it is determined as the UCell is in the idle state, the communication node can start signal transmission in the UCell. This kind of procedure is referred to as listen-before-talk (LBT).

For example, when an eNB or a UE transmits a signal in the LTE system, it is necessary for other communication nodes such as WiFi and the like to perform the LBT not to cause any interference. For example, a CCA threshold is regulated by −62 dBm for a non-WiFi signal and −82 dBm for a WiFi signal, respectively, in WiFi standard (e.g., 802.11ac). For example, if a non-WiFi signal is received with power equal to or greater than −62 dBm, an STA or an AP does not transmit a signal in order not to cause any interference. When the STA or the AP performs CCA in WiFi system, if a signal equal to or greater than the CCA threshold is not detected for more than 4 us, the STA or the AP can perform signal transmission.

For example, regulation of Europe illustrates two types of LBT-based operation respectively referred to as FBE (frame based equipment) and LBE (load based equipment).

Figure 14:
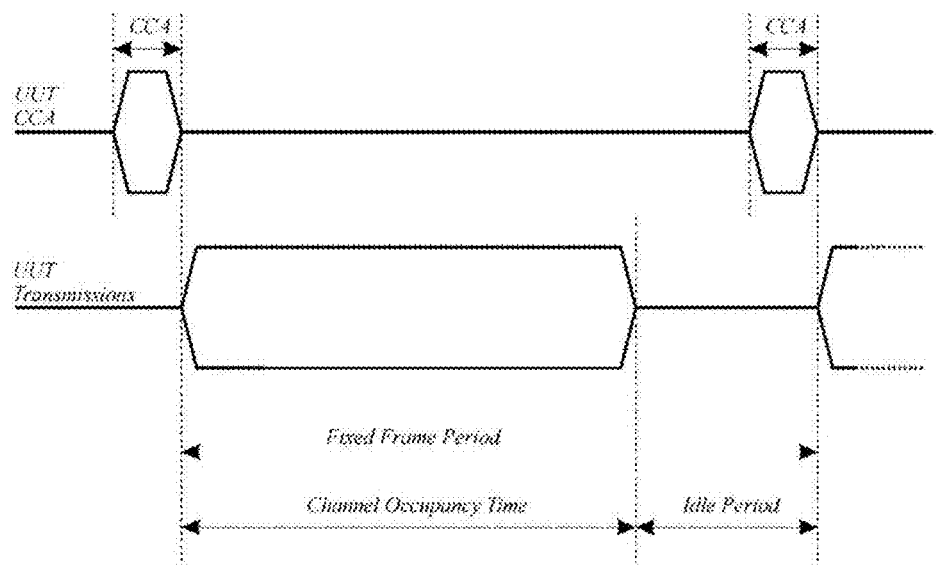
FIGS. 14 and 15 illustrate a FBE operation.
Figure 15:
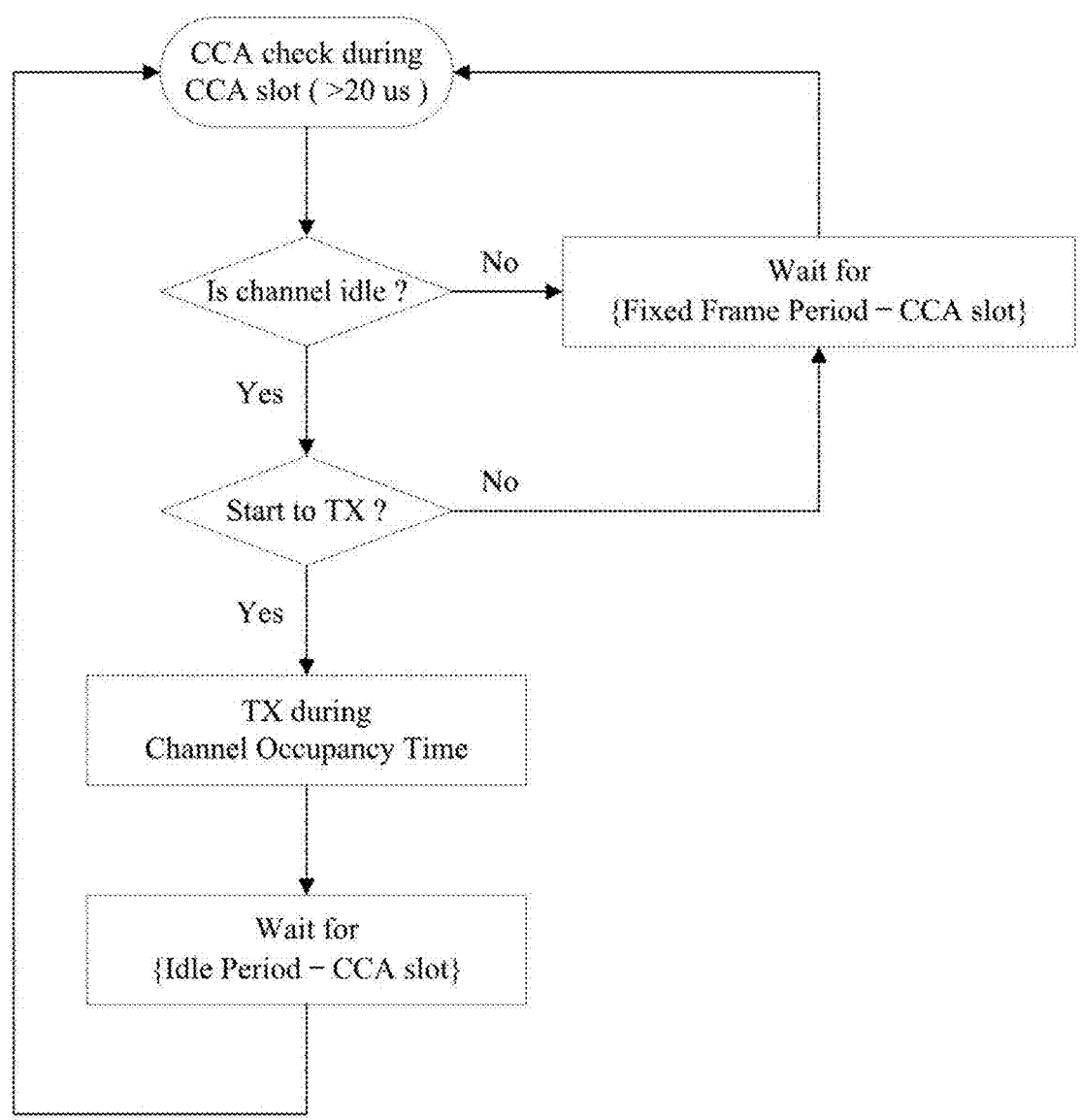

FIG. 14 illustrates a FBE operation according to ETSI regulation (EN 301 893 V1.7.1) and FIG. 15 illustrates a flow of the FBE operation.

Referring to FIGS. 14 and 15, the FBE configures a single fixed frame using channel occupancy time (e.g., 1-10 ms) corresponding to time capable of maintaining transmission when a communication node succeeds in accessing a channel and an idle period corresponding to the minimum 5% of the channel occupancy time. In this case, CCA is performed via a CCA slot (e.g., minimum 20 us) defined at an end part of the idle period. The communication node periodically performs the CCA in a unit of the fixed frame. If a channel is unoccupied, the communication node transmits data during the channel occupancy time. If a channel is occupied, the communication node waits until a CCA slot of a next period while postponing transmission.

Figure 16:
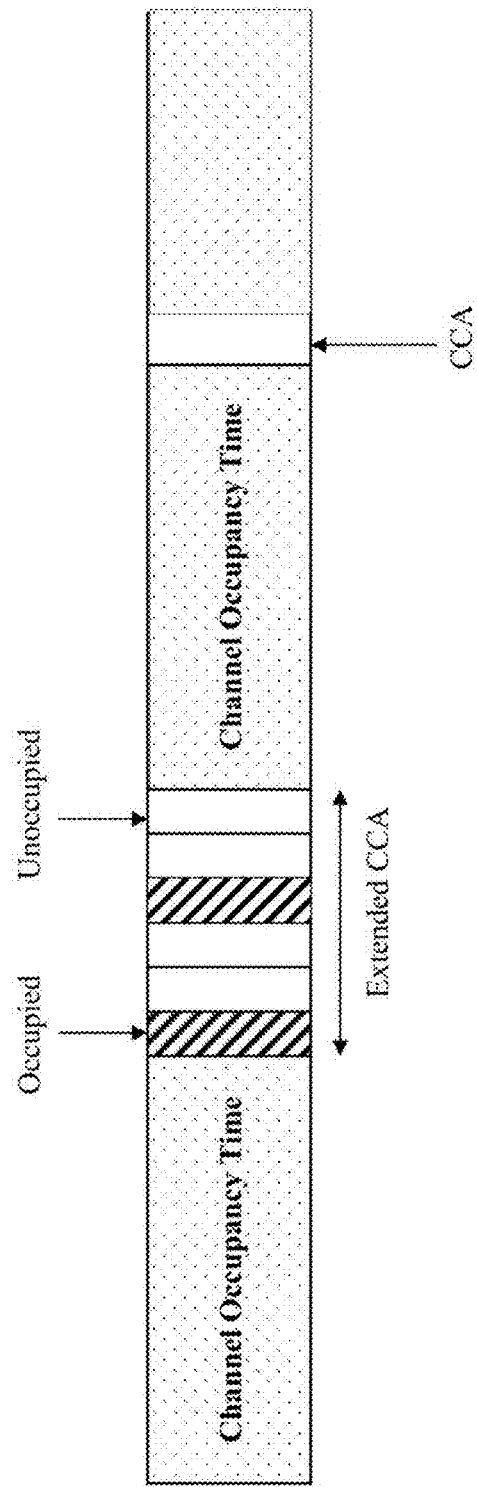
FIGS. 16 and 17 illustrate am LBE operation.
Figure 17:
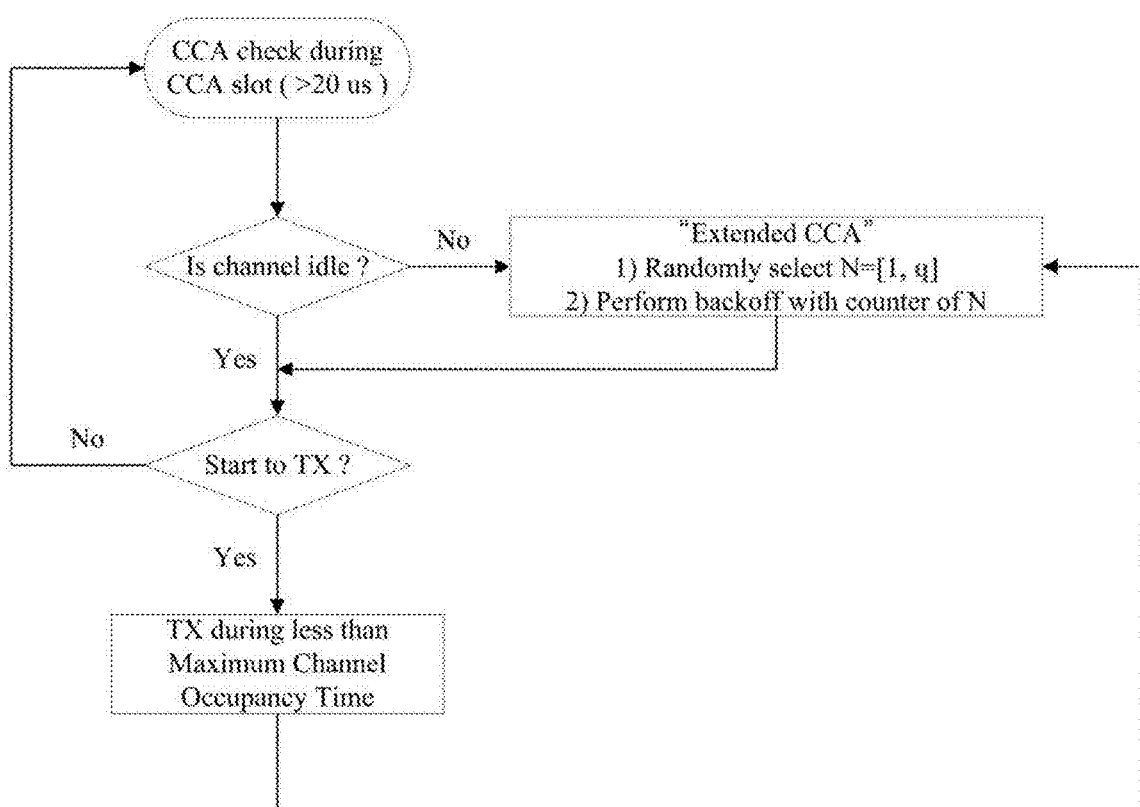

FIG. 16 illustrates an LBE operation and FIG. 17 illustrates a flow of the LBE operation.

Referring to FIGS. 16 and 17, in case of the LBE, a communication node configures a value of $q \in \{4, 5, \ldots, 32\}$ first and performs CCA on a single CCA slot. If a channel is unoccupied in the first CCA slot, the communication node can transmit data by securing channel occupancy time as much as a length of $(13/32)q$ ms. If a channel is occupied in the first CCA slot, the communication node randomly selects a value of $N \in \{1, 2, \ldots, q\}$, stores the selected value as an initial value of a counter, and senses a channel state in a unit of a CCA slot. If a channel is unoccupied in a specific CCA slot, the communication node reduces the value stored in the counter by 1. If the value of the counter becomes 0, the communication node can transmit data by securing time as much as a length of $(13/32)q$ ms.

CCA in U-Cell Operating Based on LAA

Recently, 3GPP LTE system is considering a method of managing a plurality of U-Scells in U-band as a technology for LAA. According to the ETSI regulation, when transmission power of entire signals transmitted on U-band is fixed, if a bandwidth on which the signals are transmitted increases (i.e., if the number of U-scells increases), a CCA threshold can be reduced. For example, according to the ETSI regulation, if PH corresponding to specific transmit power is equal to or less than 23 dBm, a CCA threshold (TL) can be calculated as equation 1 described in the following.

$$TL = -73 \text{ dBm/MHz} + (23 \text{ dBm} - P_H)/(1 \text{ MHz}) \quad \text{[Equation 1]}$$

Referring to equation 1, the TL is defined on the basis of 1 MHz unit channel size. In particular, the CCA threshold is defined in proportion to a size of a bandwidth to be actually transmitted by a transmitter.

For example, when transmit power corresponds to 23 dBm and a transmitter transmits a bandwidth of a size of 20 MHz (e.g., 1 U-Scell), the TL becomes −73 dBm/MHz*20 MHz=−60 dBm. In this case, '*20 MHz' means that a CCA threshold power value for 1 MHz channel increases 20 times. Specifically, since −73 dBm corresponds to $10^{-7.3}$ mW, the meaning of −73 dBm/MHz*20 MHz corresponds to $10^{-7.3} \times 20$ mW. If the $10^{-7.3} \times 20$ mW is converted into a dBm unit, it may obtain 10×log 10 ($10^{-7.3}$×20)=−60 dBm. In this case, the 'log 10 ( )' corresponds to a common log having a base as much as 10.

As a different example, when transmit power corresponds to 23 dBm and a transmitter transmits a bandwidth of a size of 40 MHz (e.g., 2 U-Scells), the TL becomes −73 dBm/MHz*40 MHz=−57 dBm. As a further different example, when transmit power corresponds to 20 dBm and a transmitter transmits a bandwidth of a size of 20 MHz (e.g., 1 U-Scell), the TL becomes −70 dBm/MHz*20 MHz=−57 dBm. When transmit power corresponds to 20 dBm and a transmitter transmits a bandwidth of a size of 40 MHz (e.g., 2 U-Scells), the TL becomes −70 dBm/MHz*40 MHz=−54 dBm. In particular, the CCA threshold may change according to transmit power and a bandwidth of a signal transmitted on U-band.

Adjustment of Transmit Power

When a plurality of nodes perform signal transmission based on LBT (listen before talk) in a wireless communication system and a CCA (channel assessment) threshold changes according to transmit power of a transmission node and a transmission bandwidth, methods of adjusting the transmit power are proposed according to the number of U-Scells capable of transmitting a signal according to an LBT operation on a U-band (unlicensed band).

Proposal #1

Assume a situation that a transmission node configures a transmit power value by $P_0$ for U-band and intends to transmit a signal to the $N_1$ number of U-Scells. When the transmission node succeeds in performing channel access on the $N_2$ (<$N_1$) number of U-SCells by performing LBT using a CCA threshold $TL_0$ corresponding to the $P_0$ and the entire bandwidth ($BW_1$) of the $N_1$ number of U-SCells, it may be able to adjust transmit power according to one of methods described in the following.

(1) When a $P_x$ is selected under the condition that an LBT result is not changed by a CCA threshold $TL_x$ corresponding to transmit power $P_x$ and the entire bandwidth $BW_2$ of the $N_2$ number of U-SCells, a maximum value of the $P_x$ is configured as transmit power for transmitting the entire signals on U-band.

(2) When transmit power $P_1=P_0*(BW_2/BW_1)$ and a CCA threshold $TL_1$ corresponding to $BW_2$ do not change an LBT result, the $P_1$ is configured as transmit power for transmitting the entire signals on U-band.

For example, when both LTE system according to the embodiment of the present invention and ETSI regulation are applied at the same time, assume that an eNB has transmit power of 23 dBm. In this case, the eNB may prepare to transmit PDSCH to two U-SCells (e.g., U-Scell$_1$ and U-Scell$_2$) each of which has 20 MHz bandwidth using 20 dBm (i.e., 20 dBm+20 dBm=23 dBm). In order to transmit the PDSCH, the eNB performs LBT using 23 dBm and −57 dBm CCA threshold corresponding to 40 MHz (i.e., 20+20 MHz). When LBT is performed at specific timing, if it is determined that signal transmission is available in a single U-Scell only, the eNB can simply assign the entire transmit power of 23 dBm to the single U-Scell (e.g., U-SCell$_2$) capable of performing signal transmission.

However, the abovementioned case corresponds to a case that a BW is changed while transmit power is fixed. Hence, according to the ETSI regulation, the eNB should perform the LBT on the basis of a value (i.e., −60 dBm) that the CCA threshold is reduced as much as 3 dB. Depending on channel environment, the CCA threshold of −60 dBm may change a legacy LBT result (e.g., U-Scell$_2$ is idle) of which the CCA threshold is not changed. In other word, it may determine that a signal is not transmitted in the U-Scell$_2$ (e.g., U-Scell$_2$ is busy).

In particular, the eNB can apply a maximum transmit power value within a range capable of identically maintaining the legacy LBT result.

Or, in order to avoid a dynamic change of transmit power, the eNB may apply transmit power corresponding to the number of U-SCells (or, the entire bandwidth of U-SCells) selected according to an LBT operation. For example, as mentioned in the foregoing description, when an LBT operation is performed on 2 U-SCells, if it is determined that a single U-Scell is available only, it may configure 20 dBm corresponding to the half of the initially intended transmit power (i.e., 23 dBm) as transmit power in U-band. In this case, since a CCA threshold is applied by a value higher than the transmit power as much as 3 dB, the legacy LBT result can be identically maintained.

Proposal #2

According to one embodiment, a transmission node (or, an eNB) transmits information on U-SCells (i.e., number of U-Cells and a transmit power value in each U-Scell), which are assumed by the transmission node to configure transmit power, to a reception node (or, a UE) in advance. Having received the information, the reception UE may assume that the transmit power is semi-statically changed.

For example, in case of the operation (2) of the proposal #1, an eNB calculates maximum transmit power by assuming the number of U-SCells to be managed by the eNB and may be able to calculate transmit power per U-Scell by dividing the maximum transmit power by the number of the U-SCells. The eNB may maintain the transmit power per U-Scell irrespective of an LBT operation.

In this case, the eNB can provide the U-Scell information, which is assumed to calculate the transmit power, to the UE to prevent the UE from assuming that the transmit power is dynamically changed.

Proposal #3

When a separate control node indicates a transmission node to transmit a signal with transmit power of $P_{TX}$, if the $P_{TX}$ is greater than $P_{CMAX}$ corresponding to a maximum transmit power limit of the transmission node, the transmit power can be adjusted according to one of methods described in the following.

(1) The transmission node determines whether to perform transmission by applying a CCA threshold on the basis of the $P_{TX}$ and a transmission bandwidth. When the transmission node practically performs transmission, the transmission is performed by lowering transmit power using the $P_{CMAX}$.

(2) The transmission node determines whether to perform transmission by applying a CCA threshold using $P_{CMAX}$ and performs transmission using the $P_{CMAX}$.

For example, when UL transmission is performed, transmit power of a UE can be configured according to an indication of an eNB. Yet, in some cases, the eNB may set a transmit power value ($P_{TX}$), which is greater than a $P_{CMAX}$ value corresponding to the maximum transmit power value of the UE, to the UE via power control. If the UE is able to configure a CCA threshold according to the $P_{TX}$, the UE is able to comprehend the $P_{TX}$ as a value signaled by the eNB to indicate the CCA threshold. In particular, the UE may follow the $P_{CMAX}$ to practically transmit a signal while performing an LBT operation by calculating a CCA threshold according to the $P_{TX}$.

Or, the UE may determine the $P_{TX}$ indication of the eNB as an error and performs an LBT operation by calculating a CCA threshold according to the $P_{CMAX}$. In this case, the $P_{CMAX}$ can be applied as transmit power for practically transmitting a signal.

Proposal #4

Assume that a separate control node indicates a transmission node to transmit a signal to a plurality of U-Scells (i.e., [U-SCell$_1$, U-SCell$_2$, . . . , U-SCell$_N$]) using transmit power per USscell (i.e., [$P_{TX, 1}$, $P_{TX, 2}$, . . . , $P_{TX, N}$]). If the sum (i.e., $P_{TX, 1}+P_{TX, 2}$ . . . $+P_{TX, N}=P_{TX}$) of the transmit power per USscell has a value greater than a maximum transmit power limit ($P_{CMAX}$) of the transmission node, transmit power can be adjusted using one of methods described in the following.

For clarity, assume that [$P_{TX, 1}'$, $P_{TX, 2}'$, . . . , $P_{TX, N}'$] is defined as transmit power per U-Scell satisfying $P_{TX, 1}'+P_{TX, 2}'+$ . . . $+P_{TX, N}'=P_{CMAX}$. In this case, the $P_{TX, i}'$ is equal to or less than the $P_{TX, i}$ and the i corresponds to 1, 2, . . . , N.

(1) The transmission node determines whether to perform transmission by applying a CCA threshold on the basis of [$P_{TX, 1}$, $P_{TX, 2}$, . . . , $P_{TX, N}$] (or, $P_{TX}$) and a transmission bandwidth for the N number of U-SCells. In this case, the transmission node performs transmission by applying transmit power per U-Scell selected from among [$P_{TX, 1}'$, $P_{TX, 2}'$, . . . , $P_{TX, N}'$] to U-Scell in which actual transmission is performed.

(2) The transmission node determines whether to perform transmission by applying a CCA threshold on the basis of [$P_{TX, 1}'$, $P_{TX, 2}'$, . . . , $P_{TX, N}'$] (or, $P_{CMAX}$) and a transmission bandwidth for the N number of U-SCells. In this case, the transmission node performs transmission by applying transmit power per U-Scell selected from among [$P_{TX, 1}'$, $P_{TX, 2}'$, . . . , $P_{TX, N}'$] to U-Scells in which actual transmission is performed.

(3) The transmission node determines whether to perform transmission by applying a CCA threshold on the basis of [$P_{TX, 1}'$, $P_{TX, 2}'$, . . . , $P_{TX, N}'$] (or, $P_{CMAX}$) and a transmission bandwidth for the N number of U-SCells. As mentioned earlier in the 'proposal #1', the transmission node adjusts the total transmit power for U-Scells capable of performing actual transmission using $P_{CMAX,LBT}$. The transmission node performs transmission by performing scaling on transmit power per U-Scell selected from among [$P_{TX, 1}'$, $P_{TX, 2}'$, . . . , $P_{TX, N}'$] using ($P_{CMAX,LBT}/P_{CMAX}$).

(4) The transmission node determines whether to perform transmission by applying a CCA threshold on the basis of [$P_{TX, 1}$, $P_{TX, 2}$, . . . , $P_{TX, N}$] (or, $P_{TX}$) and a transmission bandwidth for the N number of U-SCells. The transmission node selects USscells capable of performing transmission according to a priority under the condition that the sum of the transmit power of the U-SCells is equal to or less than $P_{CMAX}$. The transmission node performs transmission by applying transmit power per U-Scell selected from among [$P_{TX, 1}$, $P_{TX, 2}$, . . . , $P_{TX, N}$].

(5) The transmission node selects USscells capable of performing transmission according to a priority under the condition that the sum of the transmit power of the U-SCells is equal to or less than $P_{CMAX}$. The transmission node determines whether or not each U-Scell performs transmission by applying a CCA threshold on the basis of the sum ($P_{TX, S}$) of transmit power (e.g., $P_{TX, i}$, i=1, 2, . . . , N) indicated to the selected U-SCells by the eNB and a transmission bandwidth for the selected U-SCells. The transmission node applies transmit power per U-Scell selected from among [$P_{TX, 1}$, $P_{TX, 2}$, . . . , $P_{TX, N}$] to the U-SCells.

(6) If the transmission node corresponds to a UE, the UE selects U-Scells to make the sum of transmit power of U-Scells to be equal to or less than $P_{CMAX}$. When the UE selects the U-Scells, the UE can select the U-Scells according to a predetermined priority. The UE calculates $P_{TX, S}$ corresponding to the sum of transmit power (e.g., $P_{TX, i}$, i=1, 2, . . . , N) indicated by the eNB for the selected U-SCells. The UE determines a CCA threshold on the basis of the $P_{TX, S}$ and the entire transmission bandwidth of the selected U-SCells and determines U-SCells capable of performing transmission using the determined CCA threshold. Subsequently, as mentioned earlier in the proposal #1, the UE adjusts transmit power for the entire U-band using $P_{TX, S, LBT}$ based on the U-Scells capable of performing transmission according to an LBT operation. The UE can perform scaling on transmit power of the U-SCells selected from among [$P_{TX, 1}$, $P_{TX, 2}$, . . . , $P_{TX, N}$] using ($P_{TX, S, LBT}/P_{TX, S}$).

For example, when UL transmission is performed, assume a state that the UE sets UL power control to make a PUSCH to be transmitted on a CC1 and a CC2 defined in U-band using $P_{TX1}$ and $P_{TX2}$, respectively. If a maximum transmit power limit of the UE is set to the entire U-band using $P_{CMAX}$ (in this case, $P_{TX1}+P_{TX2}>P_{CMAX}$), it may consider operations described in the following.

(a) The UE performs LBT by applying a CCA threshold on the basis of the $P_{TX1}$ and the $P_{TX2}$. In case of transmitting both, each of transmit powers can be lowered to $P_{TX1}'$ and $P_{TX2}'$, respectively. (In this case, $P_{TX1}'+P_{TX2}'=P_{CMAX}$)

(b) If the UE performs LBT by applying a CCA threshold on the basis of $P_{TX1}'$ and $P_{TX2}'$, the UE is able to transmit both CCs. Yet, if the UE performs LBT by applying a CCA threshold on the basis of $P_{TX1}$ and $P_{TX2}$, it may fail to transmit a CC. In this case, (i) the UE transmits both CCs by configuring transmit power using $P_{TX1}'$ and $P_{TX2}'$ or (ii) the UE may transmit one CC only using transmit power of $P_{TX1}$ or $P_{TX2}$.

In particular, if a UL power control value indicated by the eNB exceeds a maximum transmit power value of the UE, the UE can recognize the UL power control value indicated by the eNB as a value indicated for the usage of a CCA threshold. Or, the UE may recognize the UL power control value indicated by the eNB as an improperly indicated value and configures a CCA threshold based on a maximum transmit power value of the UE to perform an LBT operation. Or, the UE may recognize the UL power control value indicated by the eNB as transmit power intended by the eNB and may be able to perform an LBT operation using a CCA threshold according to the indicated transmit power value. As a result of the LBT operation, the UE can perform signal transmission on maximum U-Scells capable of performing transmission only.

Proposal #5

When a maximum transmit power limit $P_{CMAX}$ of a transmission node is set and a correlation among transmit power, a transmission bandwidth, and a CCA threshold exists, it may adjust the transmit power and the CCA threshold without following the correlation in the following cases.

(1) The CCA threshold is increased when the transmit power is decreased. If a maximum CCA threshold is set, a transmission node may configure the increased CCA threshold to be equal to or less than the maximum CCA threshold while decreasing the transmit power.

(2) The CCA threshold is decreased when the transmit power is increased. If a minimum CCA threshold is set, (i) a transmission node may set a limit on a maximum value of transmit power using a transmit power value corresponding to the minimum CCA threshold or, (ii) the transmission node may set a limit on the maximum value of the transmit power using $P_{CMAX}$.

For example, referring to equation 1, if transmit power is reduced to 18 dBm, a CCA threshold increases. In this case, if a signal is transmitted on 20 MHz band, the CCA threshold can be configured by (−73+5) dBm/MHz*20 MHz=−55 dBm.

Yet, if WiFi devices currently existing on U-band transmit a signal on 20 MHz band, the CCA threshold may have a value up to maximum −62 dBm. In order for lately introduced LAA cells to coexist with Wi-Fi, a maximum CCA threshold identical to that of the WiFi can also be set to the LAA cells. Hence, although transmit power is decreased, the CCA threshold may not be increased more than a specific value. Or, as a case of increasing transmit power, if a minimum CCA threshold is set, a maximum value of transmit power can be limited by transmit power corresponding to the minimum CCA threshold. For example, in equation 1, a minimum CCA threshold corresponds to −73 dBm and transmit power corresponding to the minimum CCA threshold corresponds to 23 dBm. Hence, it may set a limit on maximum transmit power to make the maximum transmit power to be equal to or less than 23 dBm.

Proposal #6

When transmit power of a transmission node varies according to an LBT operation in a plurality of U-SCells, a range for a ratio of CRS EPRE (energy per resource element) to PDSCH EPRE (or, a parameter determining the ratio) can be changed according to a carrier type (or, higher layer signal or DCI).

In a wireless communication system such as 3GPP LTE, and the like, EPRE (energy per resource element) is defined for power allocation of a downlink resource. In this case, CRS EPRE may become a reference. The CRS EPRE is configured by a higher layer signal. The CRS EPRE has a fixed value in a downlink system band and a subframe. A PDSCH EPRE can be represented by a certain ratio of the CRS EPRE. For example, a ratio of the CRS EPRE to the PDSCH EPRE is defined by $\rho_A$ in an OFDM symbol where a CRS does not exist. The ratio of the CRS EPRE to the PDSCH EPRE is defined by $\rho_B$ in an OFDM symbol where a CRS exists. In this case, the $\rho_A$ is determined by a power offset $\delta_{power-offset}$ according to whether or not MIMO is applied and $P_A$ corresponding to a UE-specific variable. $\rho_B/\rho_A$ is determined by the number of antenna ports and $P_B$ corresponding to a cell-specific variable.

In LTE system (e.g., Rel-12), the $\rho_A$ is differently defined for two cases. When PDSCH data is transmitted based on a transmission diversity scheme via 4 cell-common antenna ports, the $\rho_A$ is determined by equation 2.

$$\rho_A = \delta_{power-offset} + P_A 10 \log_{10}(2)_{[dB]} \qquad \text{[Equation 2]}$$

In this case, $\delta_{power-offset}$ corresponds to a power offset value for supporting a MU-MIMO operation and the $\delta_{power-offset}$ is set to 0 dB when other PDSCH is transmitted. $P_A$ corresponds to a UE-specific variable. For example, referring to Table 9, a parameter 'p-a' corresponds to the $P_A$ and the $P_A$ may have a value selected from among [−6 dB, −4.77 dB, −3 dB, −1.77 dB, 0 dB, 1 dB, 2 dB, 3 dB].

TABLE 9

| PDSCH-Config information element | |
| --- | --- |
| -- ASN1START | |
| PDSCH-ConfigCommon ::= | SEQUENCE { |
| referenceSignalPower | INTEGER (−60..50), |
| p-b | INTEGER (0..3)} |
| PDSCH-ConfigDedicated::= | SEQUENCE { |
| p-a | ENUMERATED { |
| | dB-6, dB-4dot77, dB-3, |
| | dB-1dot77, dB0, dB1, dB2, |
| | dB3}} |
| -- ASN1STOP | |

The $P_A$ is defined by equation 3 except a case of transmitting PDSCH based on transmission diversity.

$$\rho_A = \delta_{power-offset} + P_{A[dB]} \qquad \text{[Equation 3]}$$

In LTE system, a cell-specifically defined $P_B$ corresponds to a ratio of $\rho_B/\rho_A$ according to the number of antenna ports. Referring to Table 9, a parameter 'p-b' corresponds to the $P_B$ and has a value selected from among 0 to 3. And, Table 10 illustrates transmit power allocation according to each $P_B$ value ranging from 0 to 3.

TABLE 10

| | $\rho_B/\rho_A$ | |
| --- | --- | --- |
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

In this case, as mentioned in the foregoing description, in U-band, transmit power may vary according to the number of U-SCells capable of practically performing transmission according to an LBT operation. Hence, a difference between the CRC EPRE and the PDSCH EPRE can be increased compared to a legacy LTE system.

Hence, one embodiment of the present invention proposes a method of changing a range of a ratio of the CRS EPRE to the PDSCH EPRE according to a carrier type (or, higher layer signal or DCI). For example, it may more expand a range of the $P_A$ in U-band. Specifically, the range of the $P_A$ can be expanded to [−9 dB, −7.77 dB, −6 dB, −4.77 dB, −3 dB, −1.77 dB, 0 dB, 1 dB, 2 dB, 3 dB].

The $P_B$ can also be expanded as shown in Table 11.

TABLE 11

| | $\rho_B/\rho_A$ | |
| --- | --- | --- |
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |
| 4 | 1/5 | 1/4 |

The aforementioned proposal #6 can also be applied to an arbitrary RS. In particular, a ratio of specific RS power to PDSCH power can be configured to have a different range according to a carrier type (or, higher layer signal or DCI) and an eNB can inform a UE of the information. For example, when it is able to indicate a ratio of CSI-RE EPRE to PDSCH EPRE in a unit of 1 dB in L-band (e.g., $P_C$ is the assumed ratio of PDSCH EPRE to CSI-RS EPRE when UE derives CSI feedback and takes values in the range of [−8, 15] dB with 1 dB step size), a range can be expanded to [−10, 20] dB and the like in U-band.

Proposal #7

An eNB sets (reference) CRS EPRE for transmitting a discovery signal to a UE in U-band and can signal a CRS EPRE value for transmitting PDSCH using a ratio value compared to the (reference) CRS EPRE. In this case, the (reference) CRS EPRE (1) can be applied in discovery signal occasion (i.e., a section in which a discovery signal is actually transmitted) only, or (2) can be applied in a DMTC (Discovery signals measurement timing configuration) section (i.e., a section in which a discovery signal is expected to be transmitted).

In particular, it is preferable to fix transmit power of a CRS, which is transmitted as a discovery signal for measuring RRM, even in a situation that the transmit power is dynamically changed. In this case, CRS EPRE for transmitting a discovery signal may become a reference value for indicating power of different transmission signals. For example, a CRS EPRE value for transmitting PDSCH also corresponds to a ratio value compared to CRS EPRE (e.g., reference CRS EPRE) for transmitting a discovery signal. The CRS EPRE value can be transmitted to a UE via higher layer signaling (e.g., RRC signaling) or dynamic L1 signaling (e.g., DCI).

The proposal #1 can also be applied to an arbitrary RS. For example, an eNB can inform a UE of a ratio of specific RS power to reference CRS power via higher layer signaling (e.g., RRC signaling) or dynamic L1 signaling (e.g., DCI).

CCA Threshold

The aforementioned CCA threshold can also be referred to as an energy detection threshold.

First of all, when DL transmission defined in LTE Rel-13 system is performed, an energy detection threshold for an LBT operation is explained. An eNB accessing a channel on which LAA Scell transmission is performed should configure an energy detection threshold ($X_{Thresh}$) to be equal to or less than a maximum energy detection threshold ($X_{Thresh\_max}$). In this case, the maximum energy detection threshold ($X_{Thresh\_max}$) varies according to whether or not it is able to share a carrier on which LBT is performed by a different wireless access technology (e.g., WiFi, etc.) on a long term basis.

If an absence of the different wireless access technology sharing the carrier is guaranteed on a long term basis, the maximum energy detection threshold ($X_{Thresh\_max}$) is defined as equation 4 described in the following.

$$X_{Thresh\_max} = \min\left\{ \begin{array}{l} T_{max} + 10 \text{ dB}, \\ X_r \end{array} \right\}$$ [Equation 4]

In equation 4, $T_{max}$ corresponds to a value determined according to a bandwidth of a corresponding carrier. The $T_{max}$ is defined as equation 5 described in the following.

$$T_{max}(\text{dBm}) = 10 \cdot \log 10(3.16228 \cdot 10^{-8}(\text{mW/MHz}) \cdot BWMHz(\text{MHz}))$$ [Equation 5]

When regulatory requirements exist, $X_r$ corresponds to a maximum energy detection threshold defined according to the regulatory requirements. If the regulatory requirements do not exist, the $X_r$ is configured by $T_{max}$+10 dB.

On the contrary, if the absence of the different wireless access technology sharing the carrier is not guaranteed, for example, if a signal of the different wireless access technology is actually detected in the carrier or if there is a possibility of detecting the signal, the maximum energy detection threshold ($X_{Thresh\_max}$) is defined as equation 6 described in the following.

$$X_{Thresh\_max} = \max\left\{ \begin{array}{l} -72 \text{ dBm (20 MHz)}, \\ \min\left\{ \begin{array}{l} T_{max}, \\ T_{max} - T_A + (P_H - P_{TX}) \end{array} \right\} \end{array} \right\}$$ [Equation 6]

In equation 6, $T_A$ corresponds to a constant determined according to a type of signal to be transmitted by a transmission node. When a transmission including PDSCH is performed, the $T_A$ corresponds to 10 dB. When a transmission including a discovery signal while PDSCH is not included is performed, the $T_A$ corresponds to 5 dB. And, $P_H$ corresponds to 23 dBm.

$P_{TX}$ is configured by maximum transmission node (e.g., eNB) output power for a corresponding carrier. An eNB uses the set maximum transmission power over a single carrier irrespective of whether single carrier or multi-carrier transmission is employed. For example, when an eNB intends to perform a transmission on a single carrier of 20 MHz using 23 dBm, the $P_{TX}$ is configured by 23 dBm. Yet, when the eNB intends to perform transmission using 20 dBm per 10 MHz channel by dividing 23 dBM into 20 dBm+20 dBm (e.g., 20 dBm transmission is performed on one 10 MHz carrier and 20 dBm transmission is performed on another 10 MHz carrier, CA), the $P_{TX}$ is configured by 10 dBm corresponding to the maximum transmit power over a single carrier.

The abovementioned energy detection threshold in LTE system corresponds to a value configured on the basis of a CCA operation on 20 MHz. Hence, it is necessary to define an energy detection threshold when a transmission node operates on 10 MHz in addition to 20 MHz.

For example, assume that LAA system coexists with WiFi and an eNB performs 10 MHz+10 MHz CA (carrier aggregation) operation on 20 MHz band in total. And, assume that a transmission node has transmit power of 20 dBm on 10 MHz carrier (i.e., $P_{TX}$=20 dBm). In this case, if the aforementioned method of configuring the energy detection threshold of LTE system is applied, an energy detection threshold can be configured as equation 7 described in the following.

$$X_{Thresh\_max} = \max\left\{ \min\left\{ \begin{array}{l} X_0 \text{ dBm (10 MHz)} \\ 10\log 10(3.16228 \cdot 10^{-8}) \\ 10\log 10(3.16228 \cdot 10^{-8}) + (23-20) \cong -72 \text{ dBm} \end{array} \right\} \right\}$$ [Equation 7]

$$= \max\{X_0(10 \text{ MHz})\text{dBm}, -72 \text{ dBm}\}$$

$X_0$ corresponds to a first maximum value of an energy detection threshold which is defined irrespective of transmit power of an eNB on 10 MHx. For example, since −72 dBm is assumed on 20 MHx (e.g., equation 6), if it is designed to detect the same energy per unit frequency, −75 dBm corresponding to the half of −72 dBm can be configured on 10 MHz. However, referring to equation 7, a second maximum value of the energy detection threshold, which is configured in consideration of $P_H$ and $P_{TX}$, is calculated as −72 dBm. Hence, a maximum value $X_{Thresh\_max}$=max (the first maximum value, the second maximum value) of a finally induced energy detection threshold becomes −72 dBm.

Consequently, in case of 10 MHz, energy per unit frequency corresponding to a reference for detecting energy is configured to be doubled compared to a case of 20 MHz. If $X_{Thresh\_max}$=−72 dBm is satisfied not only on 10 MHz but also on 20 MHz, energy per unit frequency on 10 MHz channel is doubled compared to energy per unit frequency on 20 MHz channel.

Specifically, in case of 10 MHz+10 MHz, although an eNB uses power (i.e., 20 dBm+20 dBm=23 dBm) identical to power for transmitting 23 dBm over 20 MHz, if the total detection energy for the totaled 20 MHz band does not exceed −69 dBm (i.e., −72 dBm+−72 dBm=−69 dBm), it may perform transmission. In particular, in case of performing 10+10 MHz CA, the eNB can perform a more aggressive LBT compared to a case of performing single carrier transmission.

In particular, when the eNB performs transmission on each 10 MHz, the eNB performs the transmission with power density (e.g., power per unit frequency) identical to power density for transmitting 23 dBm on 20 MHz. However, since equation 6 does not reflect the abovementioned fact and the $P_{TX}$ on 10 MHz corresponds to 20 dBm which is less than 23 dBm, adaptation is performed according to the decrease of the $P_{TX}$. Hence, it may have such an irrational result as an energy detection threshold which is increased as much as 3 dBm. In other word, although power density transmitted on a single carrier is not reduced, since equation 6 shows transmit power $P_{TX}$ of an eNB in a unit of a carrier, the equation 6 determines that the $P_{TX}$ is reduced and makes energy detection adaption to be performed.

Consequently, according to the equation 6, it may have a problem that a result of performing LBT on a single carrier of 20 MHz is different from a result of performing LBT on 10+10 MHz CA. In other word, when a transmission node Specifically, a method of changing the $P_H$ of equation 6 into equation 8 and/or a method of changing the $P_{TX}$ of equation 6 into equation 9 are proposed.

(1) Method of changing $P_H$ according to equation 8

$$P_H = 23 \text{ dBm} + 10 * \log 10(\text{BWMHz}/20 \text{ MHz}) \quad \text{[Equation 8]}$$

(2) Method of changing $P_{TX}$ according to equation 9

$$P_{TX} = P_{TX,Carrier} + 10 * \log 10(20 \text{ MHz}/\text{BWMHz}) \quad \text{[Equation 9]}$$

In equation 9, $P_{TX,\ Carrier}$ corresponds to a value of output power of an eNB for a corresponding carrier represented in a unit of dBm. In equations 8 and 9, BWMHz corresponds to a value of a bandwidth for a corresponding carrier represented in a unit of MHz. And, 'log 10 ( )' corresponds to a common log with a base being 10. That is, 'log 10 (10)=1'.

The $P_H$ of equation 8 and/or the $P_{TX}$ of equation 9 may be comprehend as that increasing/decreasing the $P_H$ and/or the $P_{TX}$ by converting a ratio between a bandwidth (e.g., BW) of an actual carrier and a reference carrier bandwidth (e.g., 20 MHz) into a unit of decibel after configuring 20 MHz as a reference of a carrier bandwidth.

For example, in equation 8, since the $P_H$ has a value of 23 dBm on the reference 20 MHz bandwidth, 23 dBm can be comprehended as reference $P_H$ power. If a bandwidth of a U-Scell in which CCA is performed corresponds to A MHz, a transmission node adjusts the reference $P_H$ power as much as a decibel value of a ratio between 20 MHz and the A MHz (e.g., 10*log 10(A/20).

Similarly, in equation 9, the $P_{TX}$ has a value of $P_{TX,\ Carrier}$ dBm on the 20 MHz bandwidth which being the reference and the $P_{TX,\ Carrier}$ becomes a reference for power per carrier.

For example, if the equation 8 is applied according to the method (1), $P_H$=23 dBm+10*log 10(10/20)≈20 dBm is satisfied. Hence, a maximum value of an energy detection threshold on 10 MHz can be calculated as equation 11 described in the following.

$$X_{Thresh\_max} = \max\left\{ \begin{array}{l} X_0 \text{ dBm}(10 \text{ MHz}) \\ \min\left\{ \begin{array}{l} 10\log 10(3.16228 \cdot 10^{-8}) \\ 10\log 10(3.16228 \cdot 10^{-8}) + (20-20) \cong -75 \text{ dBm} \end{array} \right\} \end{array} \right\} \quad \text{[Equation 11]}$$

$$= \max\{X_0(10 \text{ MHz})\text{dBm}, -75 \text{ dBm}\}$$

senses a single channel of 20 MHz with the same transmit power value, it is determined that the channel is in a busy state. However, it may be determined that the channel is in an idle state in the 10+10 MHz CA situation.

In the following, methods for solving abovementioned problem are explained.

Proposal #8

As mentioned in the foregoing description, assume that a transmission node (e.g., eNB or UE) sets an energy detection threshold (or, a maximum value of the energy detection threshold) for a specific carrier (or, CCA bandwidth) having a arbitrary bandwidth by utilizing $P_H$ or $P_{TX}$. In this case, the transmission node can determine the $P_H$ and/or the $P_{TX}$ based on a bandwidth of the carrier (or, a bandwidth on which CCA is performed). For example, as the bandwidth of the carrier (or, the bandwidth on which CCA is performed) is getting wider, the transmission node can increase the $P_H$ or decrease the $P_{TX}$.

In particular, if $X_0$ is sufficiently small, a maximum value of an energy detection threshold on 10 MHz is configured as −75 dBm. Hence, it may be able to identically configure an energy level per unit frequency for a case of −72 dBm which is the maximum value of the energy detection threshold for 20 MHz and a case of −75 dBm which is the maximum value of the energy detection threshold for 10 MHz.

Or, as shown in equation 12, a transmission node can decrease a $T_A$ value as a bandwidth of a carrier (or, CCA bandwidth) is getting wider. Or, as shown in equation 13, the transmission node can adopt, as a separate variable, a $T_B$ value which is increased as a bandwidth is getting wider.

(3) Method of changing $T_A$ according to equation 12

$$T_A = T_{A,old} + 10 * \log 10(20 \text{ MHz}/\text{BWMHz}) \quad \text{[Equation 12]}$$

$T_{A\_old}$ corresponds to a value irrespective of a carrier bandwidth (or, CCA bandwidth). The $T_{A\_old}$ corresponds to a constant determined according to a type of a signal to be transmitted by a transmission node. If the transmission node corresponds to an eNB, for a transmission including PDSCH, the $T_A$ corresponds to 10 dB, and for a transmission including a discovery signal and excluding PDSCH, the $T_A$ corresponds to 5 dB. If the transmission node corresponds to a UE, the $T_A$ is configured as 10 dB for the transmission of PUSCH and the $T_A$ is configured as 5 dB for the transmission of PUCCH or PRACH, by which the present invention may be non-limited.

(4) Method of adopting $T_B$ $$T_B = 10*\log 10(BW\text{MHz}/20\text{ MHz}) \qquad \text{[Equation 13]}$$

In equation 13, a method of applying a newly defined $T_B$ can be more segmented. For example, a maximum value ($X_{Threshold\_max}$) of an energy detection threshold can be simply represented as 'max {EQ_B, min ($T_{max}$, EQ_A)}'. EQ_A corresponds to an equation for calculating an energy detection threshold (or, a maximum value of an energy detection threshold) in consideration of $P_H$ and $P_{TX}$ and EQ_B corresponds to an equation for calculating an energy detection threshold (or, a maximum value of an energy detection threshold) without considering $P_H$ and $P_{TX}$. For example, in case of the equation 6, since the EQ_B has a constant value of −72 dBm and the EQ_B makes a maximum value of an energy detection threshold ($X_{Threshold\_max}$) to be equal to or greater than −72 dBm, it may be able to comprehend the EQ_B as an equation for defining a lower bound of the maximum value of the energy detection threshold.

The $T_B$ defined in equation 13 can be applied to either the EQ_A or the EQ_B only. Or, the $T_B$ can be applied to both the EQ_A and the EQ_B. Equations 14 to 17 illustrate various examples to which the $T_B$ is applied.

(i) In case that $T_B$ is applied to EQ_A only, $$X_{Thresh\_max} = \max\left\{ \min\left\{ \begin{array}{c} -72\text{ dBm} \\ T_{max} \\ T_{max} - T_A + T_B + (P_H - P_{TX}) \end{array} \right\} \right\} \qquad \text{[Equation 14]}$$

(ii) In case that $T_B$ is applied to both EQ_A and EQ_B, $$X_{Thresh\_max} = \max\left\{ \min\left\{ \begin{array}{c} -72\text{ dBm} + T_B \\ T_{max} \\ T_{max} - T_A + T_B + (P_H - P_{TX}) \end{array} \right\} \right\} \qquad \text{[Equation 15]}$$

(iii) When EQ_B corresponds to a function of a bandwidth and $T_B$ is applied to EQ_A only, $$X_{Thresh\_max} = \max\left\{ \min\left\{ \begin{array}{c} T_{max} - T_A \\ T_{max} \\ T_{max} - T_A + T_B + (P_H - P_{TX}) \end{array} \right\} \right\} \qquad \text{[Equation 16]}$$

(iv) When EQ_B corresponds to a function of a bandwidth and $T_B$ is applied to both EQ_A and EQ_B, $$X_{Thresh\_max} = \max\left\{ \min\left\{ \begin{array}{c} T_{max} - T_A + T_B \\ T_{max} \\ T_{max} - T_A + T_B + (P_H - P_{TX}) \end{array} \right\} \right\} \qquad \text{[Equation 17]}$$

In the equations 14 to 17, $T_A$ corresponds to a value determined irrespective of a carrier bandwidth (or, CCA bandwidth). The $T_A$ corresponds to a constant determined according to a type of a signal to be transmitted by a transmission node. If the transmission node corresponds to an eNB, the $T_A$ corresponds to 10 dB for a transmission including PDSCH and the $T_A$ corresponds to 5 dB for a transmission including a discovery signal but excluding PDSCH. If the transmission node corresponds to a UE, the $T_A$ is configured as 10 dB to transmit PUSCH and the $T_A$ is configured as 5 dB to transmit PUCCH or PRACH, by which the present invention may be non-limited.

$P_H$ corresponds to 23 dBm.

$P_{TX}$ is configured as maximum transmission node (e.g., eNB) output power for a corresponding carrier. An eNB uses the set maximum transmission power over a single carrier irrespective of whether single carrier or multi-carrier transmission is employed.

For $T_{max}$, it may refer to equation 5.

The equation 15 according to (ii) of the method (4) can be summarized as equation 18 described in the following.

$$X_{Thres\_max} = \max\left\{ \min\left\{ \begin{array}{c} -72 + 10\cdot\log10(BW\text{ MHz}/20\text{ MHz})\text{ dBm}, \\ T_{max}, \\ T_{max} - T_A + (P_H + 10\cdot\log10(BW\text{ MHz}/20\text{ MHz}) - P_{TX}) \end{array} \right\} \right\} \qquad \text{[Equation 18]}$$

Figure 18:
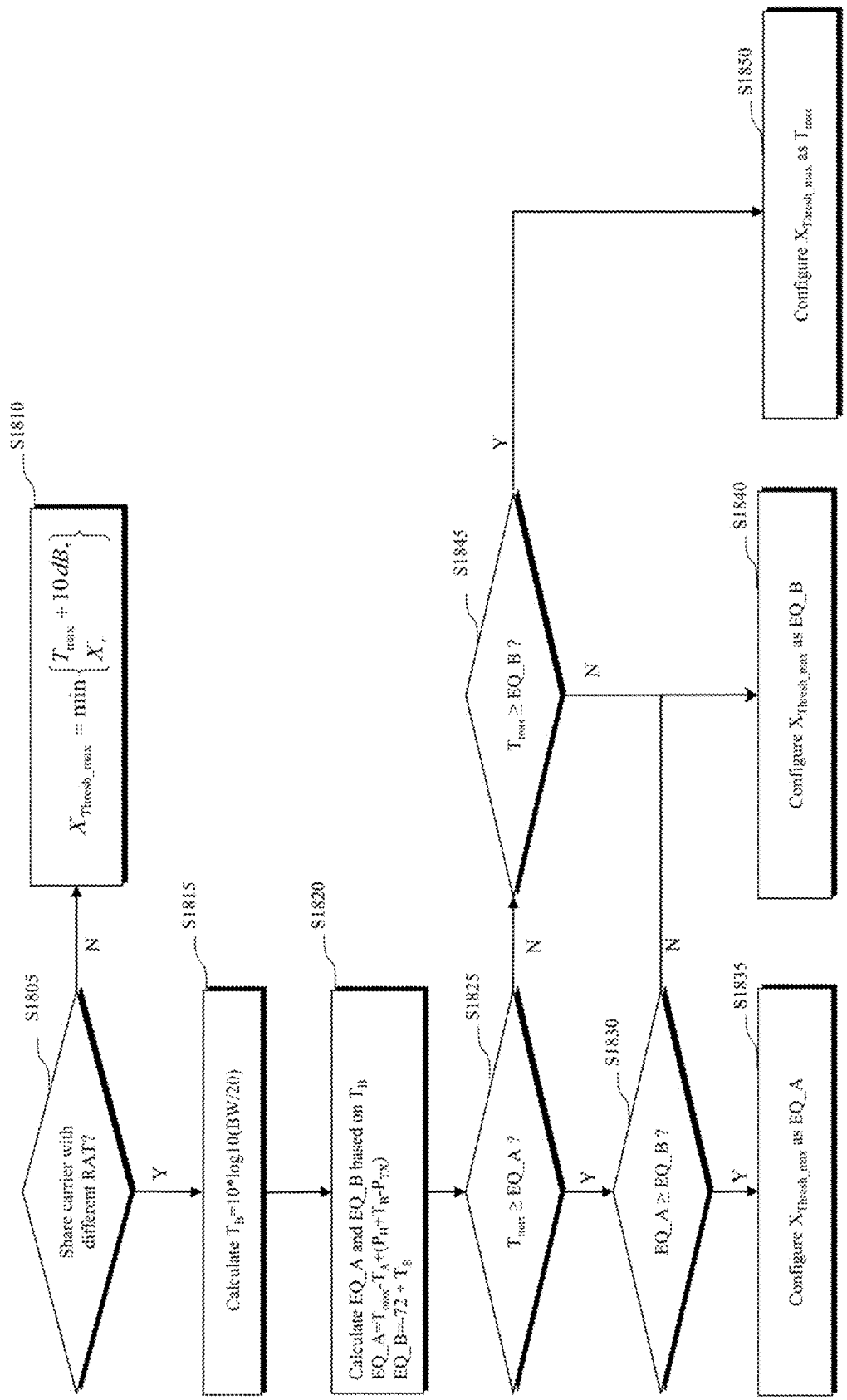
FIG. 18 is a flowchart for explaining a method of configuring a maximum value of an energy detection threshold according to one embodiment of the present invention.

FIG. 18 is a flowchart for explaining a method of configuring a maximum value of an energy detection threshold according to one embodiment of the present invention. For example, FIG. 18 is based on (ii) of the method (4). Explanation on contents overlapped with the aforementioned content can be omitted.

Assume that a transmission node (e.g., eNB or UE) performs CCA on LAA Scell. In order to perform the CCA, the transmission node determines an energy detection threshold. In this case, the energy detection threshold should be configured as a value equal to or less than a maximum value determined according to the aforementioned embodiments. Thus, the transmission node has to firstly determine the maximum value of the energy detection threshold.

If an absence of a different technology (e.g., WiFi, etc.) sharing a carrier (e.g., LAA Scell) is not guaranteed, a maximum value of an energy detection threshold according to the embodiments of the present invention can be determined based on a value (i.e., $T_B$) of a ratio between a reference bandwidth size (e.g., 20 MHz) and an actual bandwidth of LAA Scell in which CCA is performed by a transmission node.

First of all, the transmission node determines whether or not an absence of a different technology (e.g., radio access technology (RAT)) sharing a corresponding carrier (e.g., LAA Scell) can be guaranteed in a long term basis [S1805]. In particular, although a signal (e.g., WiFi) of a different RAT is not detected on a corresponding carrier during a relatively short period (e.g., short term), the transmission node is unable to determine it as the carrier is not shared by the different RAT. It is necessary for the transmission node to determine whether or not the absence of the different RAT exists on a long term basis. A time length corresponding to the long term can be determined in advance based on regulations for LAA Cell band, by which the present invention may be non-limited.

If an absence of a different technology sharing a corresponding carrier (e.g., a carrier on which LAA Scell is located) is guaranteed, the transmission node determines a maximum value of an energy detection threshold based on equation 4 [S1810].

On the contrary, if the absence of the different technology sharing a corresponding carrier (e.g., LAA Scell) is not guaranteed, the transmission node determines $T_B$ based on equation 13 [S1815].

The transmission node calculates EQ_A and EQ_B based on the $T_B$ [S1820]. For example, referring to equation 15, the EQ_A corresponds to $T_{max}-T_A+(P_H+T_B-P_{TX})$ and the EQ_B corresponds to $-72+T_B$. The $T_{max}$ is calculated by equation 5 and $P_H$ corresponds to 23 dBm. The $P_{TX}$ corresponds to transmit power. For the $T_A$, it may refer to the aforementioned description.

The transmission node compares the $T_{max}$ with the EQ_A [S1825]. The transmission node selects a smaller value from among the $T_{max}$ and the EQ_A and compares the selected value with the EQ_B.

If the $T_{max}$ is equal to or greater than the EQ_A, the transmission node compares the EQ_A with the EQ_B [S1830]. If the EQ_A is equal to or greater than the EQ_B, the transmission node configures the maximum value of the energy detection threshold as the EQ_A [S1835]. On the contrary, if the EQ_A is less than the EQ_B, the transmission node configures the maximum value of the energy detection threshold as the EQ_B [S1840].

Meanwhile, in the step S1825, if the EQ_A is greater than the $T_{max}$, the transmission node compares the $T_{max}$ with the EQ_B [S1845]. If the $T_{max}$ is equal to or greater than the EQ_B, the transmission node configures the maximum value of the energy detection threshold as the $T_{max}$ [S1850]. On the contrary, if the EQ_B is greater than the $T_{max}$, the transmission node configures the maximum value of the energy detection threshold as the EQ_B [S1840].

If the maximum value of the energy detection threshold is configured, the transmission node determines an energy detection threshold within a range not exceeding the maximum value of the energy detection threshold. The transmission node compares energy (e.g., power) of a signal detected by performing CCA on LAA Scell, with the determined energy detection threshold, and determine whether or not it is able to perform a transmission for the LAA Scell. In particular, the transmission node determines whether the LAA Scell is in an idle state or a busy state. If the LAA Scell is in the idle state, the transmission node performs signal transmission for the LAA Scell. If the LAA Scell is in the busy state, the transmission node defers the signal transmission for the LAA Scell.

Proposal #9

If a transmission node performs CCA in a bandwidth narrower than a reference bandwidth (e.g., 20 MHz), it may apply a penalty (or, encourage) value in proportion to a bandwidth of an energy detection threshold (or, a maximum value of the energy detection threshold), According to the method of configuring an energy detection threshold (a maximum value of the energy detection threshold) mentioned earlier in the proposal #8, although a bandwidth is changed, detection energy per unit frequency, which is configured on the basis of 20 MHz, is identically maintained.

Meanwhile, in environment in which an interference cell exists, among 20 MHz band capable of being divided into two 10 MHz bands, assume that the interference cell performs a transmission with signal strength (TXP1) greater than the half (e.g., −75 dBm) of −72 dBm on the first 10 MHz band and performs a transmission with signal strength (TXP2) less than the half of −72 dBm on the second 10 MHz band. For clarity, assume that TXP1+TXP2=−72 dBm is satisfied.

In the example above, since an eNB 1 performing CCA in a unit of 20 MHz detects −72 dBm on the entire 20 MHz band, the eNB 1 defers signal transmission on the entire 20 MHz band including the second 10 MHz band. On the contrary, since an eNB 2 performing CCA in a unit of 10 MHz detects signal strength less than −75 dBm on the second 10 MHz band, the eNB 2 can perform signal transmission.

According to one embodiment of the present invention, if CCA is performed on a bandwidth narrower than a reference bandwidth (e.g., 20 MHz), it may apply a penalty value to the energy detection threshold (or, the maximum value of the energy detection threshold) in consideration of an equity problem. In case of applying the penalty value, it may indicate that a prescribed value is subtracted from the energy detection threshold (or, the maximum value of the energy detection threshold), by which the present invention may be non-limited. The penalty value can be configured by a constant or can be configured in proportion to a CCA bandwidth.

On the contrary, when a CCA bandwidth is narrow, if interference is not evenly received on the whole band, channel access occasion can be reduced. Hence, it may apply an encourage value to the energy detection threshold (or, the maximum value of the energy detection threshold). In case of applying the encourage value, it may indicate that a prescribed value is added to the energy detection threshold (or, the maximum value of the energy detection threshold), by which the present invention may be non-limited. The encourage value can be configured by a constant or can be configured in proportion to a CCA bandwidth.

The penalty value or the encourage value can be reflected to a value of the $T_A$ in the equation 6.

Proposal #10

According to one embodiment of the present invention, it may be able to define an energy detection threshold (or, a maximum value of the energy detection threshold) for performing CCA in advance for the M number $\{N_1, N_2, \ldots, N_M\}$ of bandwidths. When a bandwidth on which a signal is to be transmitted corresponds to L, a transmission node can perform CCA on a narrowest bandwidth among bandwidths having a value equal to or greater than the L (or, a widest bandwidth among bandwidths having a value equal to or less than the L).

For example, if a separate energy detection threshold for 10 MHz LAA system is not defined, an energy detection threshold for 20 MHz band can be reused.

In more general, if an energy detection threshold for partial reference bandwidths (e.g., M number of bandwidths) is defined, a transmission node selects a narrowest reference bandwidth including a bandwidth on which a signal is to be transmitted and can perform CCA based on an energy detection threshold for the selected bandwidth.

Proposal #11

A transmission for LAA SCell may correspond to DL transmission of an eNB or UL transmission of a UE. When the UE performs a UL LBT operation, it may be able to define a priority for channels in the aspect of an energy detection threshold. If a channel has a higher priority, a maximum value of an energy detection threshold can be configured to be a greater value.

For example, regarding the energy detection threshold, priorities can be set to channels as follows.

PRACH>PUCCH>PUSCH with UCI piggyback>PUSCH without UCI (=PUSCH with SRS)>SRS only If LAA U-band supports UL channel transmission, a transmission probability of a UL channel on which relatively important information such as random access, UCI, or the like is transmitted can be degraded or transmission can be delayed due to LBT-based transmission of the U-band. Consequently, reliability can be reduced.

In order to solve the problem above, when a UL channel on which random access or UCI is transmitted is transmitted, it may be able to configure channel access possibility of the UL channel to be higher compared to a case that a UL LBT operation is performed on a different general channel. As a method of increasing the channel access possibility, an eNB can indicate a relatively higher energy detection threshold to be configured for a UL channel including a random access channel or UCI when a UE performs UL LBT. If the relatively higher energy detection threshold is configured, it is highly probable that a channel is determined as idle.

Meanwhile, referring to 6.2.5 Configured transmitted power of 3GPP TS 36.101, an LTE UE (e.g., UE) reflects maximum power indicated by an eNB (or, network), a power class of the UE, MPR (maximum power reduction) in consideration of PAPR (Peak-to-Average Power Ratio), A-MPR (additional maximum power reduction), P-MPR (power management term for MPR), Tolerance, and the like to determine (Configured maximum power) $P_{CMAX,c}$ of the LTE UE.

Specifically, a UE configures a maximum power value $P_{CMAX,c}$ of the UE for a serving cell c to satisfy $P_{CMAX\_L,c} \leq P_{CMAX,c} \leq P_{CMAX\_H,c}$.

The $P_{CMAX\_L,c}$ and the $P_{CMAX\_H,c}$ are defined as equation 19 described in the following.

$$P_{CMAX\_L,c}=\text{MIN}\{P_{EMAX,c}-T_{C,c}, P_{PowerClass}-\text{MAX}(MPR_c+A\text{-}MPR_c+\Delta T_{IB,c}+T_{C,c}+T_{Prose}, P\text{-}MPR_c)\}$$
$$P_{CMAX\_H,c}=\text{MIN}\{P_{EMAX,c}, P_{PowerClass}\} \quad \text{[Equation 19]}$$

In equation 19, $P_{EMAX,c}$ corresponds to a value given via RRC signaling for a serving cell C. $P_{PowerClass}$ corresponds to maximum UE power not considering tolerance. $MPR_c$ and $A\text{-}MPR_c$ correspond to maximum power reduction and additional maximum power reduction, respectively, for the serving cell C. $\Delta T_{IB,c}$ corresponds to additional tolerance for the serving cell C. $\Delta T_{C,c}$ is configured by 1.5 dB or 0 dB. $\Delta T_{ProSe}$ is configured by 0.1 dB or 0 dB depending on whether or not a UE supports D2D communication. $P\text{-}MPR_c$ corresponds to permitted maximum output power reduction. For more details of the abovementioned parameters, it may refer to 6.2.5 of 3GPP TS 36.101.

Meanwhile, if the UE determines an energy detection threshold for a UL LBT operation via at least one selected from among the aforementioned proposals 8 to 10, it may use $P_{CMAX,c}$ instead of $P_{TX}$. In more general, values described in the following can be used instead of a $P_{TX}$ value of a UE (hereinafter, $P_{TX,UE}$).

Proposal #12

In case of performing a UL LBT, it may use $P_{TX,UE}$ described in the following instead of the $P_{TX}$ of the equation 6.

$$P_{TX,UE}=P_{CMAX\_H,c}=\text{MIN}\{P_{EMAX,c}, P_{PowerClass}\} \quad (1)$$

$$P_{TX,UE}=P_{EMAX,c} \quad (2)$$

$$P_{TX,UE}=\text{MIN}\{P_{EMAX,c}-\Delta T_{C,c}, P_{PowerClass}-(\Delta T_{IB,c}+\Delta T_{C,c}+\Delta T_{Prose})\} \quad (3)$$

For example, if it is assumed that a UE determines an energy detection threshold based on the equation 6 in a UL LBT process, it may be able to use $P_{CMAX,c}$ as a $P_{TX,UE}$ value instead of $P_{TX}$. In this case, in order to make the $P_{TX,UE}$ have static characteristic, the UE considers MPR only in determining the $P_{CMAX,c}$. Or, the UE may exclude MPR (e.g., A-MPR) which varies according to a modulation order, TX RB, or the like. Or, the UE may reflect A-MPR only that assumes a highest modulation order and RB allocation of a maximum BW.

The aforementioned proposals can be applied not only to DL LBT but also to UL LBT.

Indexes assigned to the aforementioned proposals are assigned for clarity of explanation. It is not mandatory that proposals having a different index configure an independent embodiment. In particular, although it is able to individually implement each of the proposals having a different index, the proposals can be implemented as a single invention in a manner of being combined with each other.

Figure 19:
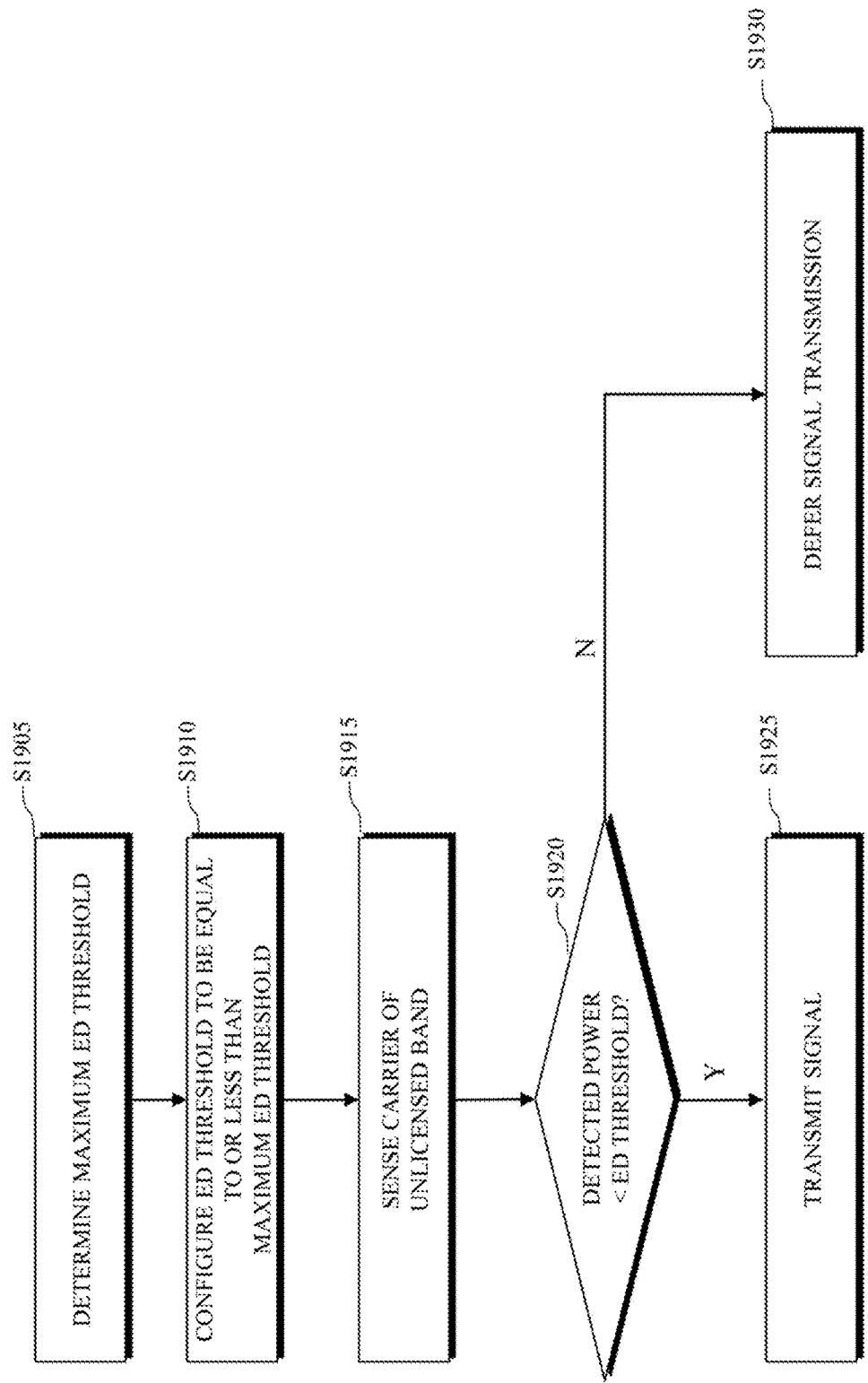
FIG. 19 a flowchart for a method of performing channel access according to one embodiment of the present invention.

FIG. 19 a flowchart for a method of performing channel access according to one embodiment of the present invention. Explanation on contents overlapped with the aforementioned content can be omitted.

Referring to FIG. 19, a transmission node (e.g., base station) determines a maximum energy detection threshold [S1905]. The maximum energy detection threshold corresponds to a maximum value of an energy detection threshold for performing CCA. The transmission node configures the energy detection threshold to be equal to or less than the maximum energy detection threshold [S1910].

The transmission node senses a carrier of an unlicensed band [S1915]. For example, a base station can sense a carrier where an LAA SCell via which a downlink signal to be transmitted by the base station, resides.

The transmission node can determine whether the carrier is in an idle state or a busy state by comparing the energy detection threshold with power which is detected as a result of the carrier sensing [S1920].

If the power detected as the result of the carrier sensing is less than the energy detection threshold, the transmission node transmits a signal via the LAA SCell [S1925]. If the detected power is equal to or greater than the energy detection threshold, the transmission node defers signal transmission [S1930]. If the signal transmission is deferred, the transmission node sets a timer for deferring channel access and may be able to perform CCA after the timer expires.

Meanwhile, if a different radio access technology (RAT) sharing a carrier is able to exist, the maximum energy detection threshold can be determined adaptively to a bandwidth of a carrier using a decibel value (e.g., $T_B$ of equation 13) of a ratio between a reference bandwidth and the bandwidth of the carrier.

The maximum energy detection threshold can be configured by a value equal to or greater than a first power value which is a sum of a lower bound of a maximum energy detection threshold for the reference bandwidth and the decibel value (e.g., $T_B$ of equation 13). The first power value can be obtained by a first equation (e.g., EQ_B of FIG. 18) '−72+10*log 10(BWMHz/20 MHz) [dBm]'. In the first equation, '20 MHz' corresponds to a reference bandwidth, 'BWMHz' corresponds to a bandwidth of a carrier represented in a unit of MHz, '10*log 10(BWMHz/20 MHz)' corresponds to a decibel value (e.g., $T_B$ of equation 13), and '−72' corresponds to a lower bound of the maximum energy detection threshold for the reference bandwidth represented in a unit of dBm.

The maximum energy detection threshold can be configured by a value equal to or greater than a second power value which is determined in consideration of a difference between the decibel value (e.g., $T_B$ of equation 13) and the maximum energy detection threshold of the transmission node configured for the carrier. The second power value can be obtained by a second equation 'min $\{T_{max}, T_{max}-T_A+(P_H+10*\log 10(BWMHz/20 \text{ MHz})-P_{TX})\}$ [dBm]'. In the second equation, '$T_{max}$' corresponds to '$10*\log 10(3.16288*10^{-8}/BWMHz)$', '$T_A$' corresponds to a constant predefined according to a type of the downlink signal, and '$P_{TX}$' may correspond to maximum transmit power of the transmission node configured for the carrier. If a downlink signal includes physical downlink shared channel (PDSCH), '$T_A$' is configured as 10 dB. If the downlink signal includes a discovery signal and does not include PDSCH, '$T_A$' can be configured as 5 dB.

And, the maximum energy detection threshold can be determined to be a greater value among a first power value obtained by adding a decibel value to −72 dBm and a second power value.

If a different RAT sharing a carrier does not exist, the maximum energy detection threshold may not exceed $T_{max}$+10 dB.

Figure 20:
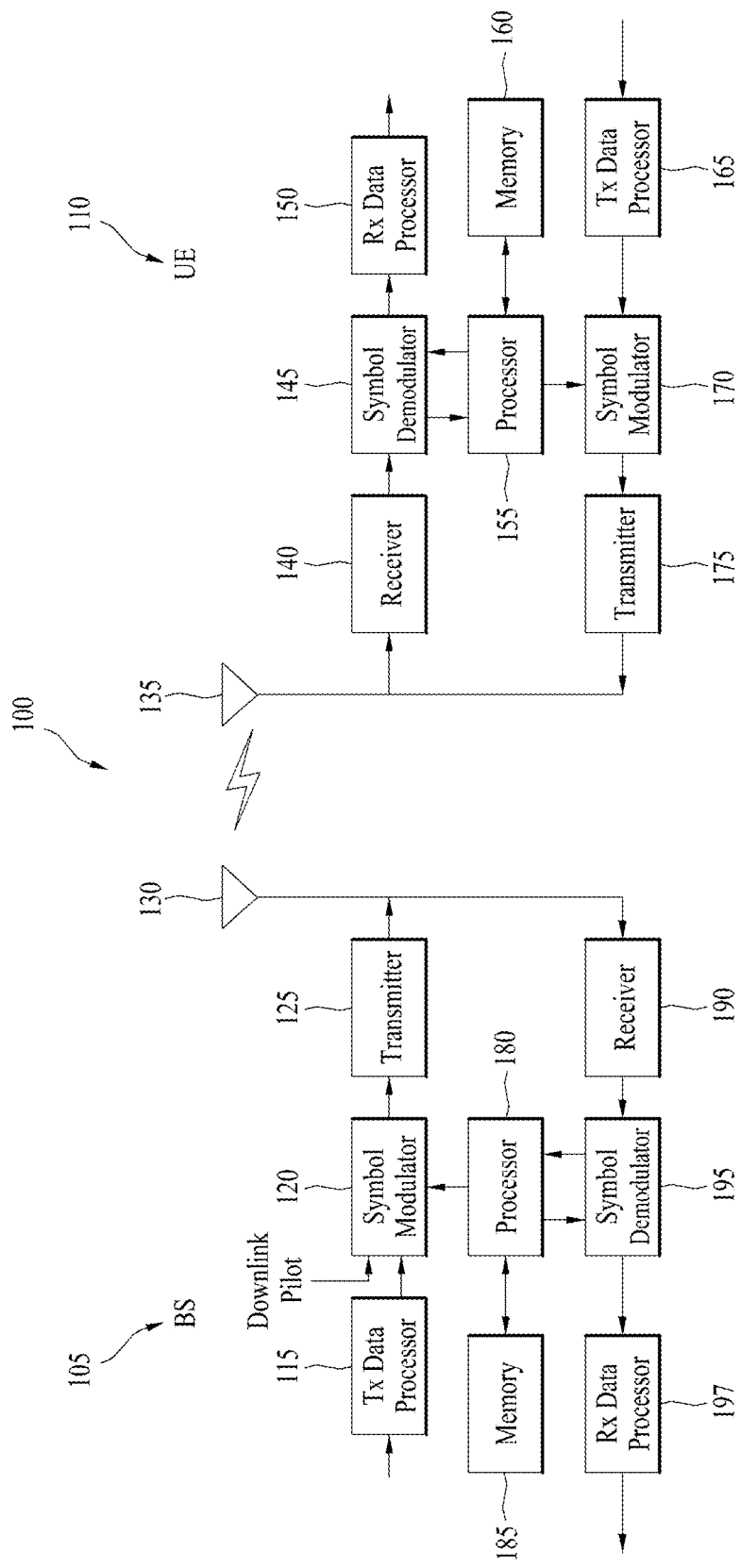
FIG. 20 is a diagram illustrating a base station and a user equipment applicable to embodiments of the present invention.

FIG. 20 is a block diagram illustrating a base station (BS) 105 and a user equipment (UE) 110 for use in a wireless communication system 100 according to the present invention. The BS and the UE of FIG. 20 may perform the operations of aforementioned embodiments.

Referring to FIG. 20, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

In the present specification, although the processor 155 of the UE and the processor 180 of the BS perform an operation of processing a signal and data except a function of receiving a signal, a function of transmitting a signal, and a storing function performed by the UE 110 and the BS 105, for clarity, the processor 155/180 is not specifically mentioned in the following description. Although the processor 155/180 is not specifically mentioned, it may assume that the processor performs a series of operations such as data processing and the like rather than the function of receiving a signal, the function of transmitting a signal, and the storing function.

According to one embodiment of the present invention, a processor of an base station senses a carrier of an unlicensed band for transmitting a downlink signal. If power detected by sensing the carrier is less than an energy detection threshold configured by the base station, a transmitter transmits the downlink signal. The energy detection threshold can be configured to be equal to or less than a maximum energy detection threshold determined by the base station. If a different radio access technology (RAT) sharing the carrier is able to exist, the maximum energy detection threshold can be determined adaptively to a bandwidth of the carrier using a decibel value of a ratio between a reference bandwidth and the bandwidth of the carrier.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention can be applied to various wireless communication systems including 3GPP based wireless communication system.

What is claimed is:

1. A method of performing channel access on an unlicensed band by a base station in a wireless communication system, the method comprising:
    sensing a carrier of an unlicensed band for transmitting a downlink signal; and
    transmitting the downlink signal when power detected by sensing the carrier is less than an energy detection threshold that is configured by the base station,
    wherein the energy detection threshold is configured to be equal to or less than a maximum energy detection threshold determined by the base station,
    wherein when a different radio access technology (RAT) sharing the carrier is able to exist, the maximum energy detection threshold is determined adaptively to a bandwidth of the carrier using a decibel value of a ratio between a reference bandwidth and the bandwidth of the carrier,
    wherein the maximum energy detection threshold is configured to be equal to or greater than a first power value which is a sum of a lower bound of the maximum energy detection threshold for the reference bandwidth and the decibel value, and
    wherein the first power value is obtained by a first equation '$-72+10*\log 10(BWMHz/20 MHz)$ [dBm]', where '20 MHz' of the first equation corresponds to the reference bandwidth, 'BWMHz' corresponds to the bandwidth of the carrier represented in a unit of MHz, '$10*\log 10(BWMHz/20 MHz)$' corresponds to the decibel value, and '$-72$' corresponds to the lower bound of the maximum energy detection threshold for the reference bandwidth represented in a unit of dBm.

2. The method of claim 1, wherein the maximum energy detection threshold is configured to be equal to or greater than a second power value which is determined in consideration of a difference between the decibel value and maximum transmit power of the base station set for the carrier.

3. The method of claim 2, wherein the second power value is obtained by a second equation '$\min\{T_{max}, T_{max}-T_A+(P_H+10*\log 10(BWMHz/20 MHz)-P_{TX})\}$ [dBm]', where '$T_{max}$' of the second equation corresponds to '$10*\log 10(3.16288*10^{-8}/BWMHz)$', '$T_A$' corresponds to a constant predefined according to a type of the downlink signal, '$P_H$' corresponds to 23 dBm, '20 MHz' corresponds to the reference bandwidth, 'BWMHz' corresponds to the bandwidth of the carrier represented in a unit of MHz, '$10*\log 10(BWMHz/20 MHz)$' corresponds to the decibel value, and '$P_{TX}$' corresponds to the maximum transmit power of the base station set for the carrier.

4. The method of claim 3, wherein the maximum energy detection threshold is determined to be a greater value among the first power value obtained by adding the decibel value to −72 dBm and the second power value.

5. The method of claim 3,
wherein when the downlink signal contains a physical downlink shared channel (PDSCH), the '$T_A$' is configured as 10 dB and
wherein when the downlink signal contains a discovery signal but does not contain the PDSCH, the '$T_A$' is configured as 5 dB.

6. The method of claim 3, wherein when the different RAT sharing the carrier does not exist, the maximum energy detection threshold does not exceed $T_{max}$+10 dB.

7. The method of claim 1,
wherein the downlink signal is transmitted via at least one licensed-assisted access secondary cell (LAA SCell) operating based on LAA and
wherein the sensed carrier corresponds to a carrier at which the at least one LAA SCell resides.

8. A base station performing channel access on an unlicensed band, the base station comprising:
a processor to sense a carrier of an unlicensed band for transmitting a downlink signal; and
a transmitter to transmit the downlink signal when power detected by sensing the carrier is less than an energy detection threshold that is configured by the base station,
wherein the energy detection threshold is configured to be equal to or less than a maximum energy detection threshold determined by the base station,
wherein when a different radio access technology (RAT) sharing the carrier is able to exist, the maximum energy detection threshold is determined adaptively a bandwidth of the carrier using a decibel value of a ratio between a reference bandwidth and the bandwidth of the carrier,
wherein the maximum energy detection threshold is configured to be equal to or greater than a first power value which is a sum of a lower bound of the maximum energy detection threshold for the reference bandwidth and the decibel value, and
wherein the first power value is obtained by a first equation '−72+10*log 10(BWMHz/20 MHz) [dBm]', where '20 MHz' of the first equation corresponds to the reference bandwidth, ' BWMHz' corresponds to the bandwidth of the carrier represented in a unit of MHz, '10*log 10(BWMHz/20 MHz)' corresponds to the decibel value, and '−72' corresponds to the lower bound of the maximum energy detection threshold for the reference bandwidth represented in a unit of dBm.

9. The base station of claim 8, wherein the maximum energy detection threshold is configured to be equal to or greater than a second power value which is determined in consideration of a difference between the decibel value and maximum transmit power of the base station set for the carrier.

10. The base station of claim 9, wherein the second power value is obtained by a second equation 'min{$T_{max}$, $T_{max}$−$T_A$+($P_H$+10*log 10(BWMHz/20 MHz)−$P_{TX}$)} [dBm]', wherein '$T_{max}$' of the second equation corresponds to '10*log 10(3.16288*10$^{-8}$/BWMHz)', where '$T_A$' corresponds to a constant predefined according to a type of the downlink signal, '$P_H$' corresponds to 23 dBm, '20 MHz' corresponds to the reference bandwidth, 'BWMHz' corresponds to the bandwidth of the carrier represented in a unit of MHz, '10*log 10(BWMHz/20 MHz)' corresponds to the decibel value, and '$P_{TX}$' corresponds to the maximum transmit power of the base station set for the carrier.

11. The base station of claim 10, wherein the maximum energy detection threshold is determined to be a greater value among the first power value obtained by adding the decibel value to −72 dBm and the second power value.

* * * * *